United States Patent [19]

Gourley

[11] Patent Number: 4,593,087

[45] Date of Patent: Jun. 3, 1986

[54] DISPERSE AND ACID AZO DYES HAVING ONE OR TWO CINNAMOYL SUBSTITUENTS ON A THIAZOLE, ISOTHIAZOLE OR THIADIAZOLE DIAZONIUM MOIETY AND HAVING AN ANILINE, TETRAHYDROQUINOLINE OR BENZOMORPHOLINE COUPLER

[75] Inventor: Robert N. Gourley, Merseyside, England

[73] Assignee: Eastman Kodak Company, Rochester, N.Y.

[21] Appl. No.: 573,253

[22] Filed: Jan. 23, 1984

[30] Foreign Application Priority Data

Oct. 7, 1983 [GB] United Kingdom ............... 8326867

[51] Int. Cl.[4] .................. C09B 29/039; C09B 29/042; C09B 29/048; D06P 1/02
[52] U.S. Cl. ..................................... 534/784; 260/508; 534/728; 534/733; 534/735; 534/764; 534/768; 534/776; 534/777; 534/785; 534/794; 534/643
[58] Field of Search ............... 260/158; 534/753, 768, 534/794, 788, 798, 784, 776, 735, 728, 733

[56] References Cited

U.S. PATENT DOCUMENTS

| | | | |
|---|---|---|---|
| 2,805,218 | 9/1957 | Towne et al. | 260/152 |
| 2,827,450 | 3/1958 | Towne et al. | 260/152 |
| 3,329,669 | 7/1967 | Sartori | 260/152 |
| 3,441,554 | 4/1969 | Hahn et al. | 260/152 |
| 4,101,543 | 7/1978 | Stiot et al. | 260/152 |
| 4,255,326 | 3/1981 | Giles et al. | 260/152 |
| 4,282,144 | 8/1981 | Weaver et al. | 260/152 |
| 4,400,318 | 8/1983 | Weaver et al. | 260/152 |
| 4,459,229 | 7/1984 | Weaver et al. | 260/152 |

FOREIGN PATENT DOCUMENTS

| | | | |
|---|---|---|---|
| 560335 | 7/1958 | Canada | 260/152 |
| 1351381 | 4/1974 | United Kingdom | 260/152 |
| 1351382 | 4/1974 | United Kingdom | 260/152 |
| 2041961 | 9/1980 | United Kingdom | 260/152 |

*Primary Examiner*—Floyd D. Higel
*Attorney, Agent, or Firm*—Donald W. Spurrell; Daniel B. Reece, III

[57] ABSTRACT

Disclosed are azo dyes containing diazonium moieties from aminothiazoles, aminoisothiazoles, or aminothiadiazoles (1,2,4- or 1,3,4-), and certain coupler moieties from aniline, tetrahydroquinoline, and benzomorpholine type compounds, wherein the diazonium moieties have at least one cinnamoyl group, and wherein a wide variety of groups, e.g., one or more water-solubilizing substituents such as sulfonic acid groups or their metal or amine salts may be present in the dye molecule. These dyes are useful for dyeing materials selected from polyamide, cellulose ester, polyester, wool and other natural and synthetic fibers and generally exhibit improvements in dyeability and fastness properties.

8 Claims, No Drawings

DISPERSE AND ACID AZO DYES HAVING ONE OR TWO CINNAMOYL SUBSTITUENTS ON A THIAZOLE, ISOTHIAZOLE OR THIADIAZOLE DIAZONIUM MOIETY AND HAVING AN ANILINE, TETRAHYDROQUINOLINE OR BENZOMORPHOLINE COUPLER

This invention relates to azo dyes containing diazonium moieties from aminothiazoles, aminoisothiazoles, or aminothiadiazoles (1,2,4- or 1,3,4-), and certain coupler moieties from aniline, tetrahydroquinoline, and benzomorpholine type compounds, wherein the diazonium moieties have at least one cinnamoyl group, and wherein a wide variety of groups, e.g., one or more water-solubilizing substituents such as sulfonic acid groups or their metal or amine salts may be present in the dye molecule. These dyes are useful for dyeing materials selected from polyamide, cellulose ester, polyester, wool and other natural and synthetic fibers and generally exhibit improvements in dyeability and fastness properties.

The present dyes have the general structures

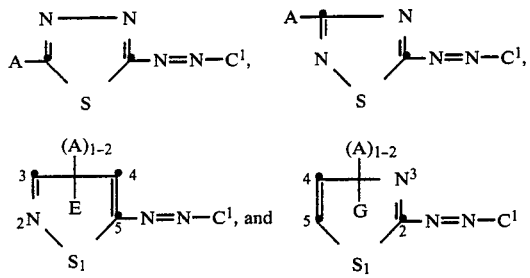

wherein: each A is a group of the structure

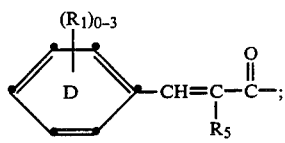

$C^1$ is an aniline, tetrahydroquinoline, or benzomorpholine type coupler which may be substituted; ring E is unsubstituted or substituted in any position not occupied by a cinnamoyl group, with a group preferably selected from alkyl, halogen, cyano, carbamoyl, CONHalkyl, alkoxycarbonyl, alkanoyl, alkanoyloxy, alkylthio, alkenylthio, arylthio cyclohexylthio, aryloxy, and alkoxy; ring G is unsubstituted or substituted in any position not occupied by a cinnamoyl group with a group preferably selected from alkyl, aryl, alkoxycarbonyl, alkanoyloxy, carbamoyl, CONHalkyl, CON(alky)$_2$, halogen, cyano, thiocyano, alkylthio, alkylsulfonyl, arylsulfonyl, formyl, acyl, and aroyl; $R_5$ is H or alkyl; and each $R_1$ is a group selected from alkyl, alkenyl of 2-6 carbons, aryl, cyclohexyl, alkoxy, halogen, hydroxy, alkylsulfonyl, cyano, carbamoyl, alkanoyl, alkanoyloxy, aroyl, alkoxycarbonyl, amino sulfamoyl, alkylsulfamoyl, dialkylsulfamoyl, alkanoylamino, $SO_3C_6H_5$, alkylthio, thiocyano, arylsulfonyl, formyl, alkylcarbamoyl, dialkylcarbamoyl, $NO_2$, $-SO_3M$, $-OSO_3M$, $-COOH$, aryloxy, arylthio, alkylsulfonylamino, aroylamino, arylsulfonylamino, and cyclohexylthio, wherein the alkyl, alkylene, alkenyl, aryl, and cyclohexyl moieties of the above $R_1$ groups, e.g., the alkyl portions of the alkanoyl groups, are unsubstituted or substituted with 1-3 substituents different from the parent moiety and independently selected from alkanoyloxy, alkyl, alkenyl, succinimido ($C_4H_4O_2N$), $-NO_2$, alkanoylamino, alkylsulfonylamino, 1-(2-pyrrolidono) ($C_4H_6ON$), halogen, cyano, alkoxy, aryl, cyclohexyl, hydroxy, $-SO_3M$, $-OSO_3M$, aryloxy, furyl ($C_4H_3O$), aroyloxy, alkoxycarbonyl, $-SO_2N-$(alkyl)$_2$, NHCOOalkyl, NHCONHalkyl, glutarimido ($C_5H_6O_2N$), phthalimido ($C_8H_4O_2N$), $CONH_2$, CONHalkyl, CON(alkyl)$_2$, alkoxyalkoxy, alkylthio, arylthio, alkylsulfonyl, and arylsulfonyl, wherein M is selected from $H^+$, $NH_4^+$, $Na^{30}$, $K^+$, and the colorless cations of salts of primary, secondary, and tertiary aliphatic and arylamines, such as triethylamine, tri(2-hydroxyethyl)amine, di(2-hydroxyethyl)amine, N,N-dimethylaniline, and especially trimethylamine.

The couplers $C^1$ preferably have the formulae:

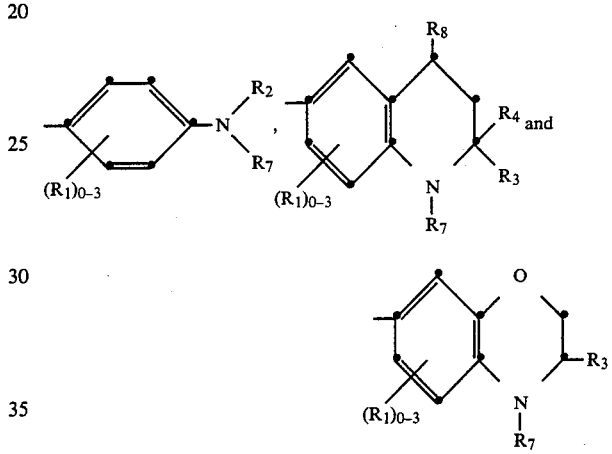

wherein each $R_1$ is defined above; $R_2$ and $R_7$ are each selected independently from hydrogen, alkyl, alkenyl of 2-6 carbons, aryl, and cyclohexyl, all of which groups are unsubstituted or substituted as defined above for the substituted $R_1$ groups; and $R_3$, $R_4$ and $R_8$ are each selected from hydrogen and alkyl.

The various alkyl and alkylene moieties of $R_1$, $R_2$, $R_3$, $R_4$, $R_5$, $R_7$ and $R_8$, including those contained, for example, in alkoxy, alkanoyl, and alkoxyalkoxy groups within the above definitions preferably contain up to 6 carbons, and they and the alkenyl groups may be straight or branched chain, and the above aryl groups preferably contain from 6-10 ring carbons.

The following are typical specific $R_1$ groups: $CH_3$, Cl, $SO_2C_2H_5$, CN, $CONH_2$, $COC_2H_5$, $COC_6H_5$, $COOC_2H_5$, $SO_2NH_2$, $SO_2NHCH_3$, $SO_2N(C_2H_5)_2$, $NHCOC_2H_5$, $SO_3C_6H_5$, $SCH_3$, SCN, $SO_2C_6H_5$, CHO, $CONHC_2H_5$, $CON(C_2H_5)_2$, OH, $NO_2$, $C_6H_5$, $C_6H_{11}$, $SO_3K$, $CF_3$, $CH_2OOCC_2H_5$, Br, $SO_2CH_2CH_2OC_2H_5$, I, $CONHCH_2CN$, $COCH_2CH_2OH$, $COC_6H_3-o-CH_3-p-OCH_3$, $COOC_2H_4-CH=CH_2$, $SO_2NHCH_2CH_2CN$, $SO_2NHCH_2$-succinimido, $SO_2NHC_2H_4-C_6H_5$, $NHCOCH_2CH_2Cl$, $SO_3C_6H_4-p-NO_2$, $SCH_2CH_2OH$, $SC_2H_4-C_6H_{11}$, $SO_2C_6H_4-p-NHCOCH_3$, $C_6H_4-p-NHSO_2CH_3$, $CONHC_2H_4NHSO_2CH_3$, $CONHCH_2CH_2OH$, $CH_2CH_2NO_2$, $C_6H_4-p-(2$-pyrrolidono), $C_6H_{10}-4-CN$, $OSO_3K$, $CH_2SO_3Na$, $OC_6H_5$, $SO_2C_2H_4OSO_3K$, $C_2H_4$-furyl, $C_2H_4OOCC_6H_5$, $COCH_2CH_2COOCH_3$, $COC_6H_4-p-SO_2NHC_6H_5$, $COOCH_2CH-$ $2SO_2NHCH_3$, $SO_2NHCH_2SO_2N(C_2H_5)_2$, $SO_2NHCH_2NHCOOCH_3$, $SO_2NHC_2H_4NHCONHCH_3$, $NHCOCH_2CH_2$—glutarimido, $SO_3C_6H_4$—p—phthalimido, $SCH_2CONH_2$, $C_6H_4$—p—$SO_2CH_3$, $SO_2C_6H_4$—p—$CONHCH_2SO_3Na$, $CH_2SO_2C_6H_5$, $CONHCH_2CH_2CON(CH_3)_2$, $CONHCH_2CH_2OCH_2CH_2OCH_2CH_3$, $CH_2CH_2SO_3H$, $C_6H_4$—p—$SC_2H_5$, $NHCOCH_3$, $C_6H_{10}$—4—$SC_6H_4$(p-$OSO_3H$), $CH_2CH=CH_2$, $COOH$, $OC_6H_5$, $OCH_3$, $SC_6H_5$, $NHSO_2CH_3$, $NHCOC_6H_5$, $NH_2$, $NHSO_2C_6H_5$, $SC_6H_{11}$, and $OOCCH_3$.

Typical for $R_3$, $R_4$, $R_5$ and $R_8$ are: H, $CH_3$, $C_2H_5$, $C_4H_9$—n, and $CH_2(CH_3)_2$.

The following are typical specific $R_2$ and $R_7$ substituents: H, $CH_3$, $C_2H_5$, $C_4H_9$—n, $CH_2CH=CH_2$, $C_6H_5$, $C_6H_{11}$, $CH_2OOCC_2H_5$, $CH_2CH_2OC_2H_5$, $CH_2CN$, $CH_2CH_2OH$, $C_6H_3$—o—$CH_3$—p—$OCH_3$, $C_2H_4$—$CH=CH_2$, $CH_2$-succinimido, $CH_2CH_2$—$C_6H_5$, $CH_2CH_2Cl$, $C_6H_4$—p—$NO_2$ $CH_2CH_2$—$C_6H_{11}$, $C_6H_4$—p—$NHSO_2CH_3$, $C_2H_4NHSO_2CH_3$, $CH_2CH_2NO_2$, $C_6H_4$—p—(2-pyrrolidono), $C_6H_{10}$—4—CN, $CH_2SO_3Na$, $CH_2CH_2OSO_3K$, $CH_2CH_2$—furyl, $CH_2CH_2OOCC_6H_5$, $CH_2CH_2COOCH_3$, $C_6H_5$—p—$SO_2NHC_6H_5$, $CH_2CH_2SO_2NHCH_3$, $CH_2SO_2N(C_2H_5)_2$, $CH_2NHCOOCH_3$, $CH_2CH_2NHCONHCH_3$, $CH_2CH_2$—glutarimido, $C_6H_4$—p—phthalimido, $CH_2CONH_2$, $C_6H_4$—p—$SO_2CH_3$, $C_6H_4$—p—$CONHCH_2SO_3Na$, $CH_2SO_2C_6H_5$, $CH_2CH_2CON(CH_3)_2$, $C_2CH_2OCH_2CH_2OC_2H_5$, $CH_2CH_2SO_3H$, $C_6H_4$—p—$SC_2H_5$, and $C_6H_{10}$—4—$SC_6H_4$(p—$OSO_3H$).

Preferred substituents for the E and H rings in addition to hydrogen are alkyl, alkylthio, halogen, cyano, alkoxycarbonyl, alkanoyl and alkanoyloxy; for each $R_1$ on the cinnamoyl rings are H, alkyl, aralkyl, aralkyl substituted with —$SO_3M$ or —$SO_4M$, cyclohexylalkyl, cyclohexylalkyl substituted with —$SO_3M$ or —$SO_4M$, alkoxy, or alkanoylamino; for $R_2$ are H or alkyl, aralkyl, aralkyl substituted with —$SO_3M$ or —$SO_4M$, cyclohexylalkyl, cyclohexylalkyl substituted with —$SO_3M$ or —$SO_4M$; for $R_7$ are H, alkyl, aralkyl, aralkyl substituted with —$SO_3M$ or —$SO_4M$, cyclohexylalkyl, cyclohexylalkyl substituted with —$SO_3M$ or —$SO_4M$, sodio- or potassiosulfatoalkyl, sodio- or potassiosulfonicalkyl, or alkanoyloxyalkyl; for each $R_1$ on the couplers are H, aralkyl, aralkyl substituted with —$SO_3M$ or —$SO_4M$, cyclohexylalkyl, cyclohexylalkyl substituted with —$SO_3M$ or —$SO_4M$, —$SO_3Na$, —$SO_3K$, halogen, —$SO_4Na$, —$SO_4K$, alkyl, alkoxy, —COOH, or —OH; for $R_3$, $R_4$ and $R_8$ are H and alkyl; and for $R_5$ is hydrogen.

The dyes of this invention impart red to blue shades on natural and synthetic fibers and exhibit improvements over such dyes as disclosed in U.S. Pat. No. 2,805,218 and British Pat. No. 1,021,399 in one or more properties such as fastness to light, ozone, chlorine, oxides of nitrogen, washing, sublimation, heat disintegration, perspiration, and crocking, leveling, transfer, exhaustion, build, pH stability, and resistance to blooming.

The intermediate compounds used in this invention are prepared according to procedures well known to the art. The present dyes are readily prepared, for example, by reacting the acetyl group of the intermediate azo compound, which itself is a dye, with benzaldehyde or a substituted benzaldehyde in acetic acid with concentrated sulphuric acid as catalyst. The acetyl dye is thus converted to a cinnamoyl substituted dye in high yield. The water-solubilizing group may be the substituent on the benzaldehyde or it may be introduced into the cinnamoyl dye at a later stage by known methods. For example, a hydroxy group in either the diazonium component or the coupling component could be reacted with sulphuric acid and then with MOH to give the —$OSO_3M$ group. Alternatively, a chloroalkyl group in the dye could be reacted with $K_2SO_3$ to give the —$CH_2SO_3K$ group. Also, sulphonation of an aromatic ring or other reactive group in the dye with a sulphonating agent such as $H_2SO_4$ or Cl—$SO_2H$ would give the solubilizing group. Such groups could also be present in the coupling component prior to diazotization and coupling.

The following Preparations, Example and tables illustrate the making and use of intermediates for the synthesis of dyes of the present invention.

PREPARATION A

α-(N-Ethylanilino)-Toluenesulfonic Acid

To 30.0 g. of 100% sulfuric acid is added N-benzyl-N-ethylaniline (30.0 g.) dropwise below about 50° C. To this solution is added, at 50°–60° C., 60% oleum (30.0 g.) with good stirring. The mixture is stirred and heated at about 60° C. for three hours and then drowned into 200 ml of water. The free sulfonic acid (Coupler I) which is mostly the meta isomer with a small amount of para, precipitates on standing and is collected by filtration, washed with water, and dried. N-Benzylanilines containing groups such as alkyl, alkoxy, and halogen in the ortho, meta, or para positions of the benzyl group may also be sulfonated by this procedure. The exact location of the sulfonic acid group in these cases is often not known and mixtures usually are produced.

Aromatic amines which contain N-aralkyl groups and which are sulfonated by the above procedure to give Couplers 2 to 11 are listed below.

| COUPLER NO. | Sulfonation product of: |
|---|---|
| 2 | N—Benzyl-N—ethyl-m-toluidine; |
| 3 | N—Benzyl-2,7-dimethyl-1,2,3,4-tetrahydroquinoline; |
| 4 | N—Benzyl-2,3-dihydro-3,6-dimethyl-1,4-benzoxazine; |
| 5 | N—Methyl-N—(2-phenylethyl)aniline; |
| 6 | N—Ethyl-N—(4-phenylbutyl)-3-chloroaniline; |
| 7 | N,N—Dibenzylaniline; |
| 8 | N—Benzyl-2,5-dimethylaniline; |
| 9 | N—Benzyl-2-methoxy-5-methylaniline; |
| 10 | N—Benzyl-2-methoxy-5-chloroaniline; and |
| 11 | N—Benzyl-N—cyclohexylaniline. |

PREPARATION B

Diazotization and Coupling of 2-Amino-5-acetyl-1,3,4-thiadiazole

Sodium nitrite (3.6 g.) is added portionwise to 25 ml. of concentrated $H_2SO_4$. The solution is cooled and 100 ml of 1:5 acid is added below 15° C. The mixture is cooled and 0.055 m. of 2-amino-5-acetyl-1,3,4-thiadiazole is added below 10° C. After stirring at 0°–5° C. for two hours, a 0.005 m. aliquot of the diazonium salt is added to a chilled solution of 0.005 m. of each of the Couplers 1–11 in 1:5 acid. The solution is kept cold and ammonium acetate added until neutral to Congo Red test paper. After allowing to stand for one hour, the coupling mixture is diluted with water, and the dye is filtered, washed and dried in air to produce intermediate dyes.

PREPARATION C

Diazotization and Coupling of 5-Amino-3-Acetyl 1,2,4-thiadiazole

5-Amino-3-acetyl-1,2,4-thiadiazole 0.055 m. is diazotized exactly as described in (b) above and a 0.005 m aliquot coupled to a 0.005 m. portion of each of the Couplers 1–11 in the manner of (b).

PREPARATION D

Diazotization and Coupling of 5-Amino-3-Acetyl-4-Cyanoisothiazole

To 25 ml. of concentrated $H_2SO_4$ is added 3.6 g. of $NaNO_2$ allowing the temperature to rise. The solution is cooled and 50 ml. of 1:5 acid is added below 10° C. Stirring is continued and 0.055 m. of 5-amino-3-acetyl-4-cyanoisothiazole is added below 5° C., followed by an additional 50 ml. of 1:5 acid. After stirring at 0°–5° C. for two hours, a 0.005 m. aliquot of the diazonium salt is cooled to 0.005 m. of each of the Couplers 1–11 as previously described.

PREPARATION E

Diazotization and Coupling of 2-Amino-5-Acetyl-4-Methylthiazole

Sodium nitrite (3.6 g.) is added portionwise to 25 ml of concentrated $H_2SO_4$. The solution is cooled and 100 ml of 1:5 acid is added below 15° C. The mixture is cooled and 0.055 m. of 2-amino-5-acetyl-4-methylthiazole is added below 10° C. After stirring at 0°–5° C. for two hours, a 0.005 m. aliquot of the diazonium salt is coupled to 0.005 m. of each of the Couplers 1–11 to produce intermediate red to violet dyes.

PREPARATION F

Sulfonation of Dye Containing an N-(Aralkylamino) Group

The dye from 2-amino-5-acetyl-1,3,4-thiadiazole and N-benzyl-N-ethylaniline (1.7 g.) is added portionwise to 15 ml. of concentrated $H_2SO_4$ over 20 min., allowing the temperature to rise to 30° C. The reaction mixture is then heated at 70° C., when the reaction is completed as evidenced by thin-layer chromatography. After the reaction mixture is drowned on ice-water mixture, 50% NaOH is added until the pH is about 7. The dye is collected by filtration, washed with water, and dried in air. The structure is as follows:

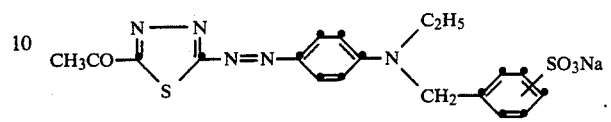

EXAMPLE

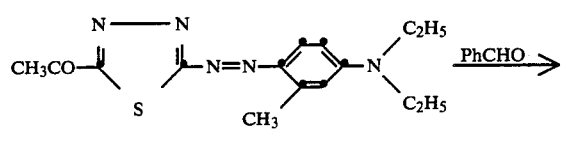

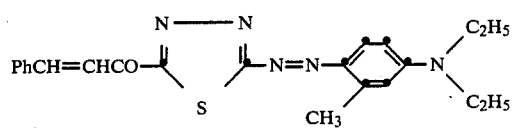

A mixture of compound (I) (2 g.), benzaldehyde (1.5 g.), acetic acid (25 ml.) and concentrated sulphuric acid (5 ml.) was stirred at 100° C. for 1.5 hours. The reaction mixture was poured into cold water and the product dye (II) filtered off, washed with water and dried. Compound (I) had previously been prepared by diazotizing 2-amino-5-acetyl-1,3,4-thiadiazole and coupling with N,N-diethyl-m-toluidine by the above procedures. The dye (II) when applied to nylon, polyester and other synthetic fibres by known techniques gave bright, bluish red shades with good dyeing and fastness properties.

By using the methods described hereinabove, the following dyes are obtained.

TABLE 1

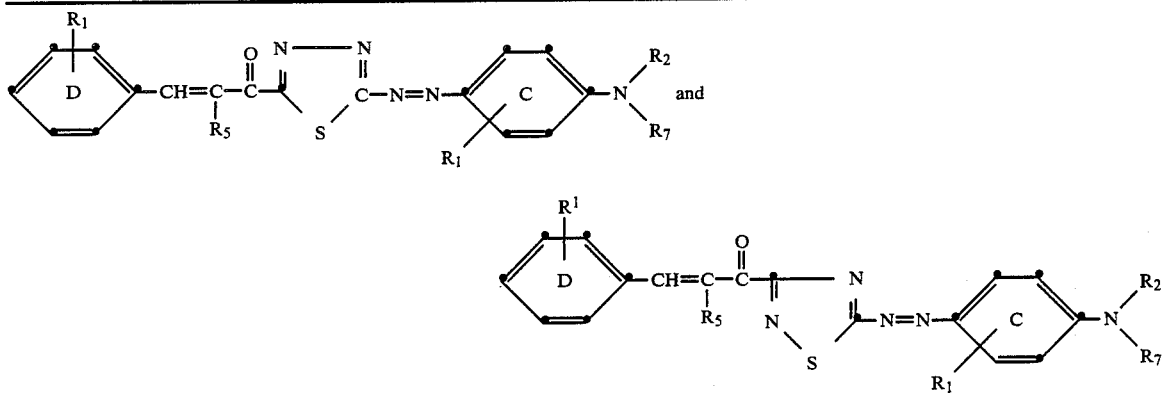

| $R_1$ on D | $R_5$ | $R_1$ on C | $R_2$ | $R_7$ |
|---|---|---|---|---|
| H | H | H | H | H |
| 4-$NO_2$ | H | 2-$CH_3$ | $C_2H_5$ | Ph |
| 4-CN | H | 5-$COCH_3$ | $C_2H_5$ | $C_6H_{11}$ |
| 5-$COCH_3$ | H | 5-$OCH_3$ | $CH_2-C_6H_4-\underline{p}-SO_4K$ | $CH_2-CH=CH_2$ |
| 4-COPh | $CH_3$ | 5-$SO_3Na$ | H | $CH_2OOCC_2H_5$ |
| 2,4-di-COOH | $CH_3$ | 5-$OCH_2CH_2SO_4K$ | $CH_2-C_6H_{10}-4-SO_3K$ | $C_6H_4-\underline{p}-OOCCH_3$ |

TABLE 1-continued

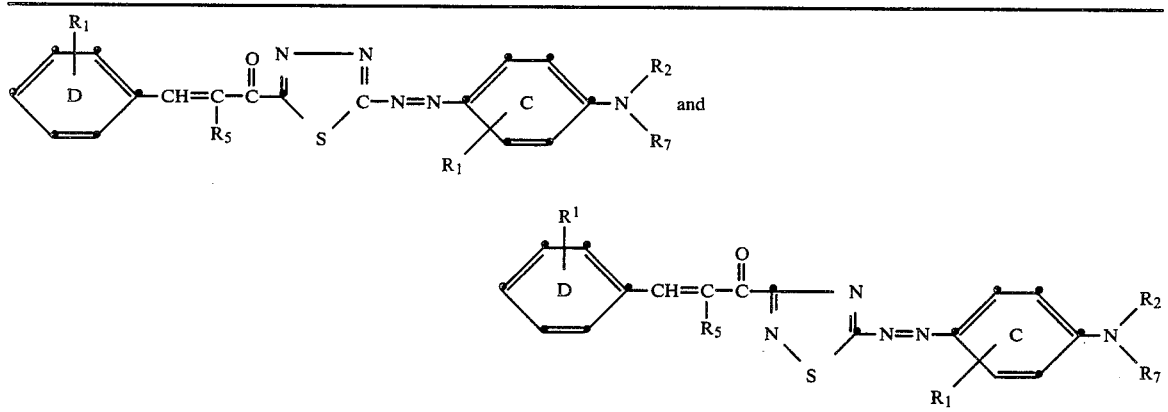

| $R_1$ on D | $R_5$ | $R_1$ on C | $R_2$ | $R_7$ |
|---|---|---|---|---|
| 4-OOCCH$_3$ | CH$_3$ | 5-OCH$_2$CH$_2$SO$_4$N H(Et)$_3$ | H | C$_6$H$_{10}$—4-CH$_3$ |
| 4-NHCOCH$_3$ | CH$_3$ | 2-CH$_3$ | CH$_2$—C$_6$H$_4$—p-SO$_4$N H(Et)$_3$ | CH$_2$CH$_2$(C$_4$H$_4$O$_2$N) |
| 4-NHCOPh | CH$_3$ | 2-Ph | CH$_3$ | CH$_2$CH$_2$NO$_2$ |
| 4-C$_2$H$_5$ | CH$_3$ | 2-NO$_2$ | CH$_3$ | C$_6$H$_4$—p-NO$_2$ |
| 4-Ph | H | 2-OCH$_3$ | CH$_3$ | CH$_2$NHOCCH$_3$ |
| 2-SO$_3$Na | H | 3-CH$_3$ | Et | Et |
| 2,5-di-Cl | H | 5-NHCOCH$_3$ | C$_2$H$_5$ | CH$_2$NHSO$_2$CH$_3$ |
| 2-Cl—4-SO$_2$CH$_3$ | H | 3-NHSO$_2$CH$_3$ | C$_2$H$_5$ | C$_6$H$_4$—p-NHOCCH$_3$ |
| 4-NHSO$_2$CH$_3$ | H | 3-COOCH$_3$ | C$_2$H$_5$ | C$_6$H$_4$—p-NHSO$_2$CH$_3$ |
| 4-COOCH$_3$ | H | 3-COOH | C$_2$H$_5$ | C$_6$H$_{10}$—4-NHCOCH$_3$ |
| 2-OCH$_3$ | C$_2$H$_5$ | 2-Cl | CH$_2$CH$_2$Cl | CH$_2$CH$_2$Cl |
| 4-OC$_2$H$_5$ | C$_2$H$_5$ | 2,6-di-Br | C$_6$H$_4$—p-Br | C$_6$H$_4$—p-Br |
| 4-SO$_3$Na | C$_2$H$_5$ | 2,6-di-Br | C$_6$H$_4$—p-CN | C$_6$H$_4$—p-CN |
| 2-SO$_3$Na | C$_2$H$_5$ | 2-OCH$_3$—5-NHCOCH$_3$ | CH$_2$CH$_2$CN | CH$_2$CH$_2$CN |
| 2-OCH$_3$—4-SO$_3$K | H | 2-CH$_2$OOCCH$_3$ | CH$_2$CH$_2$OC$_2$H$_5$ | CH$_2$CH$_2$OC$_2$H$_5$ |
| 4-OCH$_2$CH$_2$OSO$_3$K | H | 2-CH$_2$Cl | CH$_2$CH$_2$OCH$_2$CH$_2$OC$_2$H$_5$ | CH$_2$CH$_2$OCH$_2$CH$_2$OC$_2$H$_5$ |
| 2-SO$_3$Na—5-Cl | H | 2-CN | CH$_2$Ph | CH$_2$—C$_6$H$_4$—p-SO$_4$N H(Et)$_3$ |
| 4-Cl | H | 2-OOCCH$_3$ | CH$_2$C$_6$H$_{11}$ | CH$_2$C$_6$H$_{10}$—4-SO$_3$Na |
| 4-OH | H | 5-COOH | H | C$_6$H$_4$—o-OH |
| 4-CH$_2$OOCCH$_3$ | C$_3$H$_7$—n | 5-OH | C$_2$H$_5$ | CH$_2$CH$_2$OH |
| 4-SO$_3$K | C$_3$H$_7$—n | 5-CH$_2$CH=CH$_2$ | CH$_2$CH$_2$—SO$_3$K | CH$_2$CH$_2$—SO$_3$K |
| 4-OPh | H | 2-CH$_3$ | H | CH$_2$—C$_6$H$_4$—p-OSO$_3$K |
| 4-NO$_2$ | H | 5-COCH$_3$ | H | CH$_2$OPh |
| 4-C$_6$H$_4$—p-CH$_3$ | C$_2$H$_5$ | 5-C$_6$H$_4$—p-CH$_3$ | CH$_2$CH$_2$Cl | CH$_2$CH$_2$Cl |
| 4-C$_6$H$_4$—p-CH$_2$CH=CH$_2$ | C$_2$H$_5$ | 5-C$_6$H$_4$—p-CH$_2$CH=CH$_2$ | C$_6$H$_4$—p-Br | C$_6$H$_4$—p-Br |
| 4-OCH$_2$CH$_2$NO$_2$ | C$_2$H$_5$ | 5-OCH$_2$CH$_2$NO$_2$ | C$_6$H$_4$—p-CN | C$_6$H$_4$—p-CN |
| 2-CH$_2$NHCOCH$_3$ | C$_2$H$_5$ | 2-CH$_2$NHCOCH$_3$ | CH$_2$CH$_2$CN | CH$_2$CH$_2$CN |
| 4-CH$_2$NHSO$_2$C$_2$H$_5$ | H | 5-CH$_2$NHSO$_2$C$_2$H$_5$ | CH$_2$CH$_2$OC$_2$H$_5$ | CH$_2$CH$_2$OC$_2$H$_5$ |
| 4-CH$_2$CH$_2$Cl | H | 5-CH$_2$CH$_2$Cl | CH$_2$CH$_2$OCH$_2$CH$_2$OC$_2$H$_5$ | CH$_2$CH$_2$OCH$_2$CH$_2$OC$_2$H$_5$ |
| 2,6-di-CH$_2$CN | H | 2,6-di-CH$_2$CN | CH$_2$Ph | CH$_2$Ph |
| 4-CH$_2$CH$_2$OC$_2$H$_5$ | H | 5-CH$_2$CH$_2$OC$_2$H$_5$ | CH$_2$C$_6$H$_{11}$ | CH$_2$C$_6$H$_{11}$ |
| 4-CH$_2$C$_6$H$_5$ | H | 5-COOH | H | C$_6$H$_4$—o-OH |
| 4-CH$_2$C$_6$H$_{11}$ | C$_3$H$_7$—n | 5-CH$_2$C$_6$H$_{11}$ | C$_2$H$_5$ | CH$_2$CH$_2$OH |
| 4-CH$_2$CH(OH)CH$_2$OH | C$_3$H$_7$—n | 5-CH$_2$CH(OH)CH$_2$OH | CH$_2$CH$_2$—SO$_3$K | CH$_2$CH$_2$—SO$_3$K |
| 4-CH$_2$CH$_2$—SO$_3$K | H | 5-CH$_2$CH$_2$—SO$_3$K | H | C$_6$H$_4$—p-OSO$_3$K |
| 4-CH$_2$OC$_6$H$_5$ | H | 5-CH$_2$OC$_6$H$_5$ | H | CH$_2$OPh |
| 4-CH$_2$OOCC$_6$H$_5$ | H | 5-CH$_2$OOCC$_6$H$_5$ | H | CH$_2$SO$_2$NHPh |
| 5-CH$_2$COOCH$_3$ | H | 5-CH$_2$COOCH$_3$ | CH$_2$SO$_2$NHCH$_3$ | CH$_2$SO$_2$NHCH$_3$ |
| 4-C$_6$H$_4$—p-SO$_2$N(C$_2$H$_5$)$_2$ | H | 5-C$_6$H$_4$—p-SO$_2$N(C$_2$H$_5$)$_2$ | H | C$_6$H$_4$—p-SO$_2$NHCH$_3$ |
| 4-CH$_2$CH$_2$NHCOOCH$_3$ | H | 5-CH$_2$CH$_2$NHCOOCH$_3$ | CH$_2$COOCH$_3$ | CH$_2$COOCH$_3$ |
| 4-CH$_2$NHCONHCH$_3$ | H | 5-CH$_2$NHCONHCH$_3$ | H | CH$_2$SO$_2$N(CH$_3$)$_2$ |
| 4-CH$_2$CONH$_2$ | H | 5-CH$_2$CONH$_2$ | C$_2$H$_5$ | C$_6$H$_4$—p-NHCOOCH$_3$ |
| 5-CH$_2$CONHCH$_3$ | C$_4$H$_9$—n | 5-CONH$_2$ | C$_2$H$_5$ | CH$_2$CH$_2$CONH$_2$ |
| 4-CH$_2$CON(CH$_3$)$_2$ | H | 3-SO$_2$NH$_2$ | C$_2$H$_5$ | C$_6$H$_4$—p-CONHCH$_3$ |
| 4-CH$_2$CH$_2$OCH$_2$CH$_2$OC$_2$H$_5$ | H | 5-SO$_2$NHCH$_3$ | C$_2$H$_5$ | C$_6$H$_4$—p-SCH$_3$ |
| 4-CH$_2$SC$_2$H$_5$ | H | 5-SO$_2$N(C$_2$H$_5$)$_2$ | CH$_2$CH$_2$SCH$_3$ | CH$_2$CH$_2$SCH$_3$ |
| 5-CH$_2$SC$_6$H$_5$ | H | 5-SO$_3$C$_6$H$_5$ | H | CH$_2$—C$_6$H$_4$—p-SCH$_3$ |
| 4-CH$_2$SO$_2$C$_2$H$_5$ | CH$_3$ | 5-SCH$_3$ | CH$_2$SO$_2$C$_2$H$_5$ | CH$_2$SO$_2$C$_2$H$_5$ |
| 2,4-di-CH$_2$SO$_2$C$_6$H$_5$ | CH$_3$ | 2,5-di-SCN | H | CH$_2$SO$_2$Ph |
| 4-C$_6$H$_3$—o,p-di-CN | CH$_3$ | 5-SO$_2$C$_6$H$_5$ | H | CH$_2$CH$_2$OSO$_3$K |
| 4-C$_6$H$_2$—o,m,p-tri-Cl | CH$_3$ | 2-CHO—6-CN | H | C$_6$H$_4$—p-OSO$_3$K |
| 2,6-di-OSO$_3$Na | CH$_3$ | 5-CONHC$_2$H$_5$ | C$_2$H$_5$ | CH$_2$—(C$_8$H$_4$O$_2$N) |
| H | H | 5-CON(C$_2$H$_5$)$_2$ | C$_2$H$_5$ | C$_2$H$_5$ |
| H | H | 3-C$_6$H$_{11}$ | C$_2$H$_5$ | C$_2$H$_5$ |
| 5-CH$_2$(C$_8$H$_4$O$_2$N) | H | 3-SC$_6$H$_5$ | C$_2$H$_5$ | C$_2$H$_5$ |
| 5-CH$_2$(C$_4$H$_3$O) | H | 6-NHSO$_2$C$_6$H$_5$ | C$_2$H$_5$ | C$_2$H$_5$ |

TABLE 2

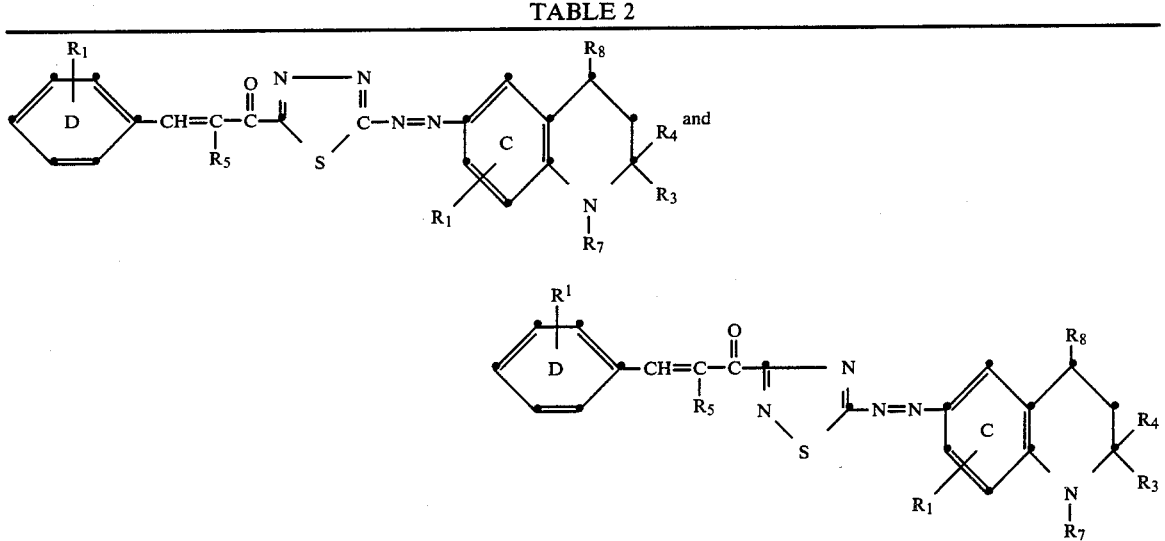

| R₁ on D | R₅ | R₁ on C | R₃ | R₄ | R₈ | R₇ |
|---|---|---|---|---|---|---|
| H | H | H | H | H | H | H |
| 4-NO₂ | H | 7-CH₃ | CH₃ | CH₃ | CH₃ | Ph |
| 4-CN | H | 5-COCH₃ | CH₃ | CH₃ | H | C₆H₁₁ |
| 5-COCH₃ | H | 5-OCH₃ | CH₃ | CH₃ | H | CH₂—CH=CH₂ |
| 4-COPh | CH₃ | 7-SO₃Na | CH₃ | CH₃ | H | CH₂OOCC₂H₅ |
| 2,4-di-COOH | CH₃ | 7-OCH₂CH₂SO₄K | CH₃ | CH₃ | H | C₆H₄—p-OOCCH₃ |
| 4-OOCCH₃ | CH₃ | 7-OCH₂CH₂SO₄N H(Et)₃ | CH₃ | CH₃ | H | C₆H₁₀—4-CH₃ |
| 4-NHCOCH₃ | CH₃ | 7-CH₃ | CH₃ | H | H | CH₂CH₂(C₄H₄O₂N) |
| 4-NHCOPh | CH₃ | 7-Ph | CH₃ | H | H | CH₂CH₂NO₂ |
| 4-C₂H₅ | CH₃ | 7-NO₂ | CH₃ | H | H | C₆H₄—p-NO₂ |
| 4-Ph | H | 7-OCH₃ | CH₃ | H | H | CH₂NHOCCH₃ |
| 2,5-di-Cl | H | 7-NHCOCH₃ | CH₃ | H | H | CH₂NHSO₂CH₃ |
| 2-Cl—4-SO₂CH₃ | H | 7-NHSO₂CH₃ | CH₃ | H | H | C₆H₄—p-NHCOCH₃ |
| 4-NHSO₂CH₃ | H | 7-COOCH₃ | CH₃ | C₂H₅ | C₂H₅ | C₆H₄—p-NHSO₂CH₃ |
| 4-COOCH₃ | H | 7-COOH | H | H | H | C₆H₁₀—4-NHOCCH₃ |
| 2-OCH₃ | C₂H₅ | 7-Cl | CH₃ | CH₃ | CH₃ | CH₂CH₂Cl |
| 4-OC₂H₅ | C₂H₅ | 5,7-di-Br | CH₃ | CH₃ | H | C₆H₄—p-Br |
| 4-SO₃Na | C₂H₅ | 5,7-di-Br | CH₃ | CH₃ | H | C₆H₄—p-CN |
| 2-SO₃Na | C₂H₅ | 5-OCH₃—7-NHCOCH₃ | CH₃ | CH₃ | H | CH₂CH₂CN |
| 2-OCH₃—4-SO₃K | H | 7-CH₂OOCCH₃ | CH₃ | CH₃ | H | CH₂CH₂OC₂H₅ |
| 4-OCH₂CH₂OSO₃K | H | 7-CH₂Cl | CH₃ | CH₃ | H | CH₂CH₂OCH₂CH₂OC₂H₅ |
| 2-SO₃Na—5-Cl | H | 7-CN | CH₃ | H | H | CH₂Ph |
| 4-Cl | H | 7-OOCCH₃ | CH₃ | H | H | CH₂C₆H₁₁ |
| 4-OH | H | 5-COOH | CH₃ | H | H | C₆H₄—o-OH |
| 4-CH₂OOCCH₃ | C₃H₇—n | 5-OH | CH₃ | H | H | CH₂CH₂OH |
| 4-SO₃K | C₃H₇—n | 5-CH₂CH=CH₂ | CH₃ | H | H | CH₂CH₂—SO₃K |
| 4-OPh | H | 7-CH₃ | CH₃ | H | H | C₆H₄—p-OSO₃K |
| 4-NO₂ | H | 7-COCH₃ | CH₃ | C₂H₅ | C₂H₅ | CH₂OPh |
| 5-CN | H | 7-OCH₃ | H | H | H | CH₂SO₂NHPh |
| 4-COCH₃ | H | 7-SO₃Na | CH₃ | CH₃ | CH₃ | CH₂SO₂NHCH₃ |
| 5-CH₃ | H | 7-OCH₂CH₂SO₄K | CH₃ | CH₃ | H | C₆H₄—p-SO₂NHCH₃ |
| 5-Ph | H | 7-OCH₂CH₂SO₃K | CH₃ | CH₃ | H | CH₂COOCH₃ |
| 5-OCH₃ | H | 7-CH₃ | CH₃ | CH₃ | H | CH₂SO₂N(CH₃)₂ |
| 4,5-di-Br | H | 7-Ph | CH₃ | CH₃ | H | C₆H₄—p-NHCOOCH₃ |
| 5-COOH | C₄H₉—n | 7-NO₂ | H | H | H | CH₂CH₂CONH₂ |
| H | H | 7-OCH₃ | CH₃ | CH₃ | CH₃ | C₆H₄—p-CONHCH₃ |
| 4-NO₂ | H | 7-NHCOCH₃ | CH₃ | CH₃ | H | C₆H₄—p-SCH₃ |
| 4-CN | H | 7-NHSO₂CH₃ | CH₃ | CH₃ | H | CH₂CH₂SCH₃ |
| 5-COCH₃ | H | 7-COOCH₃ | CH₃ | CH₃ | H | CH₂—C₆H₄—p-SCH₃ |
| 4-COPh | CH₃ | 7-COOH | CH₃ | CH₃ | H | CH₂SO₂C₂H₅ |
| 2,4-di-COOH | CH₃ | 7-Cl | CH₃ | CH₃ | H | CH₂SO₂Ph |
| 4-OOCCH₃ | CH₃ | 5,7-di-Br | CH₃ | H | H | CH₂CH₂OSO₃K |
| 4-NHCOCH₃ | CH₃ | 5,7-di-Br | CH₃ | H | H | C₆H₄—p-OSO₃K |
| 4-NHCOPh | CH₃ | 5-OCH₃—7-NHCOCH₃ | CH₃ | H | H | CH₂(C₈H₄O₂N) |
| 4-CH₂CH=CH₂ | H | 7-NHCOCH₃ | C₂H₅ | H | H | C₂H₅ |
| H | CH₃ | 7-OCPh | C₂H₅ | H | H | C₂H₅ |
| 4-CONH₂ | H | 7-CH₂CONHCH₃ | H | H | H | H |
| 3-SO₂NH₂ | H | 7-CH₃CON(CH₃)₂ | CH₃ | CH₃ | CH₃ | Ph |
| 4-SO₂NHCH₃ | H | 7-CH₂CH₂OCH₂CH₂OC₂H₅ | CH₃ | CH₃ | H | C₆H₁₁ |
| 4-SO₂N(C₂H₅)₂ | H | 7-CH₂SC₂H₅ | CH₃ | CH₃ | H | CH₂—CH=CH₂ |
| 4-SO₃C₆H₅ | CH₃ | 7-CH₂SC₆H₅ | CH₃ | CH₃ | H | CH₂OOCC₂H₅ |
| 4-SCH₃ | CH₃ | 7-CH₂SO₂C₂H₅ | CH₃ | CH₃ | H | C₆H₄—p-OOCCH₃ |
| 2,4-di-SCN | CH | 7-CH₂SO₂C₆H₅ | CH₃ | CH₃ | H | C₆H₁₀—4-CH₃ |
| 4-SO₂C₆H₄ | CH₃ | 7-C₆H₃—o,p-di-CN | CH₃ | H | H | CH₂CH₂—(C₄H₄O₂N) |
| 2-CHO—4-CN | CH₃ | 7-C₆H₂—o,m,p-tri-Cl | CH₃ | H | H | CH₂CH₂NO₂ |
| 4-CONHC₂H₅ | CH₃ | 5,7-di-OSO₃N H(CH₃)₃ | CH₃ | H | H | C₆H₄—p-NO₂ |
| 4-CON(C₂H₅)₂ | H | 5,7-di-OSO₃Na | CH₃ | H | H | CH₂NHOCCH₃ |

TABLE 2-continued

| $R_1$ on D | $R_5$ | $R_1$ on C | $R_3$ | $R_4$ | $R_8$ | $R_7$ |
|---|---|---|---|---|---|---|
| 3-$C_6H_{11}$ | H | 5,7-di-$SO_3N$ H($CH_3$)$_3$ | $CH_3$ | H | H | $CH_2NHSO_2CH_3$ |
| 3-$SC_6H_5$ | H | 7-$OSO_3N$ H($CH_3$)$_3$ | $CH_3$ | H | H | $C_6H_4$—p-$NHOCCH_3$ |
| 4-$NHSO_2C_6H_5$ | H | 5,7-di-$OSO_3Na$ | $CH_3$ | $C_2H_5$ | $C_2H_5$ | $C_6H_4$—p-$NHSO_2CH_3$ |
| 4-$SC_6H_{11}$ | H | 7-$SC_6H_{11}$ | H | H | H | $C_6H_{10}$—4-$NHOCCH_3$ |
| 4-$C_6H_4$—p-$CH_3$ | $C_2H_5$ | 7-$C_6H_4$—p-$CH_3$ | $CH_3$ | $CH_3$ | $CH_3$ | $CH_2CH_2Cl$ |
| 4-$C_6H_4$—p-$CH_2CH=CH_2$ | $C_2H_5$ | 7-$C_6H_4$—p-$CH_2CH=CH_2$ | $CH_3$ | $CH_3$ | H | $C_6H_4$—p-Br |
| 4-$OCH_2CH_2NO_2$ | $C_2H_5$ | 7-$OCH_2CH_2NO_2$ | $CH_3$ | $CH_3$ | H | $C_6H_4$—p-CN |
| 2-$CH_2NHCOCH_3$ | $C_2H_5$ | 7-$CH_2NHCOCH_3$ | $CH_3$ | $CH_3$ | H | $CH_2CH_2CN$ |
| 4-$CH_2NHSO_2C_2H_5$ | H | 7-$CH_2NHSO_2C_2H_5$ | $CH_3$ | $CH_3$ | H | $CH_2CH_2OC_2H_5$ |
| 4-$CH_2CH_2Cl$ | H | 7-$CH_2CH_2Cl$ | $CH_3$ | $CH_3$ | H | $CH_2CH_2OCH_2CH_2OC_2H_5$ |
| 2,6-di-$CH_2CN$ | H | 5,7-di-$CH_2CN$ | $CH_3$ | H | H | $CH_2Ph$ |
| 4-$CH_2CH_2OC_2H_5$ | H | 7-$CH_2CH_2OC_2H_5$ | $CH_3$ | H | H | $CH_2C_6H_{11}$ |
| 4-$CH_2C_6H_5$ | H | 7-COOH | $CH_3$ | H | H | $C_6H_4$—o-OH |
| 4-$CH_2C_6H_{11}$ | $C_3H_7$—n | 7-$CH_2C_6H_{11}$ | $CH_3$ | H | H | $CH_2CH_2OH$ |
| 4-$CH_2CH(OH)CH_2OH$ | $C_3H_7$—n | 7-$CH_2CH(OH)CH_2OH$ | $CH_3$ | H | H | $CH_2CH_2$—$SO_3K$ |
| 4-$CH_2CH_2$—$SO_3K$ | H | 7-$CH_2CH_2$—$SO_3K$ | $CH_3$ | H | H | $C_6H_4$—p-$OSO_3K$ |
| 4-$CH_2OC_6H_5$ | H | 7-$CH_2OC_6H_5$ | $CH_3$ | $C_2H_5$ | $C_2H_5$ | $CH_2OPh$ |
| 4-$CH_2OOCC_6H_5$ | H | 7-$CH_2OOCC_6H_5$ | H | H | H | $CH_2SO_2NHPh$ |
| 5-$CH_2COOCH_3$ | H | 7-$CH_2COOCH_3$ | $CH_3$ | $CH_3$ | $CH_3$ | $CH_2SO_2NHCH_3$ |
| 4-$C_6H_4$—p-$SO_2N(C_2H_5)_2$ | H | 7-$C_6H_4$—p-$SO_2N(C_2H_5)_2$ | $CH_3$ | $CH_3$ | H | $C_6H_4$—p-$SO_2NHCH_3$ |
| 4-$CH_2CH_2NHCOOCH_3$ | H | 7-$CH_2CH_2NHCOOCH_3$ | $CH_3$ | $CH_3$ | H | $CH_2COOCH_3$ |
| 4-$CH_2NHCONHCH_3$ | H | 7-$CH_2NHCONHCH_3$ | $CH_3$ | $CH_3$ | H | $CH_2SO_2N(CH_3)_2$ |
| 4-$CH_2CONH_2$ | H | 7-$CH_2CONH_2$ | $CH_3$ | $CH_3$ | H | $C_6H_4$—p-$NHCOOCH_3$ |
| 5-$CH_2CONHCH_3$ | $C_4H_9$—n | 7-$CONH_2$ | H | H | H | $CH_2CH_2CONH_2$ |
| 4-$CH_2CON(CH_3)_2$ | H | 7-$SO_2NH_2$ | $CH_3$ | $CH_3$ | $CH_3$ | $C_6H_4$—p-$CONHCH_3$ |
| 4-$CH_2CH_2OCH_2CH_2OC_2H_5$ | H | 7-$SO_2NHCH_3$ | $CH_3$ | $CH_3$ | H | $C_6H_4$—p-$SCH_3$ |
| 4-$CH_2SC_2H_5$ | H | 7-$SO_2N(C_2H_5)_2$ | $CH_3$ | $CH_3$ | H | $CH_2CH_2SCH_3$ |
| 5-$CH_2SC_6H_5$ | H | 7-$SO_3C_6H_5$ | $CH_3$ | $CH_3$ | H | $CH_2$—$C_6H_4$—p-$SCH_3$ |
| 4-$CH_2SO_2C_2H_5$ | $CH_3$ | 7-$SCH_3$ | $CH_3$ | $CH_3$ | H | $CH_2SO_2C_2H_5$ |
| 2,4-di-$CH_2SO_2C_6H_5$ | $CH_3$ | 5,7-di-SCN | $CH_3$ | $CH_3$ | H | $CH_2SO_2Ph$ |
| 4-$C_6H_3$—o,p-di-CN | $CH_3$ | 7-$SO_2C_6H_5$ | $CH_3$ | H | H | $CH_2CH_2OSO_3K$ |
| 4-$C_6H_2$—o,m,p-tri-Cl | $CH_3$ | 5-CHO—7-CN | $CH_3$ | H | H | $C_6H_4$—p-$OSO_3K$ |
| 2,6-di-$OSO_3Na$ | $CH_3$ | 7-$CONHC_2H_5$ | $CH_3$ | H | H | $CH_2(C_8H_4O_2N)$ |
| H | H | 7-$CON(C_2H_5)_2$ | $CH_3$ | H | H | $C_2H$ |
| H | H | 7-$C_6H_{11}$ | $CH_3$ | H | H | $C_2H_5$ |
| 5-$CH_2(C_8H_4O_2N)$ | H | 7-$SC_6H_5$ | $CH_3$ | H | H | $C_2H_5$ |
| 5-$CH_2(C_4H_3O)$ | H | 7-$NHSO_2C_6H_5$ | $CH_3$ | $C_2H_5$ | $C_2H_5$ | $C_2H_5$ |

TABLE 3

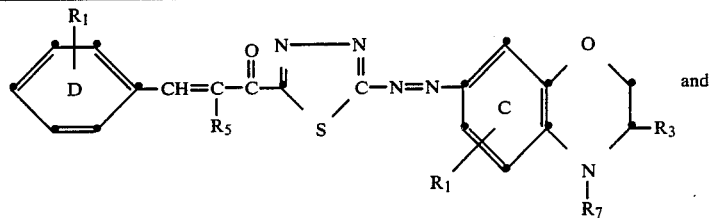

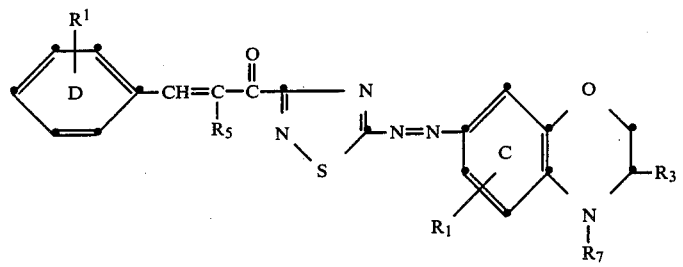

| R₁ on D | R₅ | R₁ on C | R₃ | R₇ |
| --- | --- | --- | --- | --- |
| H | H | H | H | H |
| 4-NO₂ | H | 6-CH₃ | CH₃ | Ph |
| 4-CN | H | 6-COCH₃ | C₂H₅ | C₆H₁₁ |
| 5-COCH₃ | H | 6-OCH₃ | H | CH₂—CH=CH₂ |
| 4-COPh | CH₃ | 6-SO₃Na | H | CH₂OOCC₂H₅ |
| 2,4-di-COOH | CH₃ | 6-OCH₂CH₂SO₄K | H | C₆H₄—p-OOCCH₃ |
| 4-OOCCH₃ | CH₃ | 6-OCH₂CH₂SO₄K | H | C₆H₁₀—4-CH₃ |
| 4-NHCOCH₃ | CH₃ | 6-CH₃ | H | CH₂CH₂(C₄H₄O₂N) |
| 4-NHCOPh | CH₃ | 6-Ph | CH₃ | CH₂CH₂NO₂ |
| 4-C₂H₅ | CH₃ | 6-NO₂ | CH₃ | C₆H₄—p-NO₂ |
| 4-Ph | H | 6-OCH₃ | CH₃ | CH₂NHOCCH₃ |
| 2,5-di-Cl | H | 6-NHCOCH₃ | C₂H₅ | CH₂NHSO₂CH₃ |
| 2-Cl—4-SO₂CH₃ | H | 6-NHSO₂CH₃ | CH₃ | C₆H₄—p-NHOCCH₃ |
| 4-NHSO₂CH₃ | H | 6-COOCH₃ | CH₃ | C₆H₄—p-NHSO₂CH₃ |
| 4-COOCH₃ | H | 6-COOH | H | C₆H₁₀—4-NHOCCH₃ |
| 2-OCH₃ | C₂H₅ | 6-Cl | CH₃ | CH₂CH₂Cl |
| 4-OC₂H₅ | C₂H₅ | 5,6-di-Br | C₂H₅ | C₆H₄—p-Br |
| 4-SO₃Na | C₂H₅ | 5,6-di-Br | H | C₆H₄—p-CN |
| 2-SO₃Na | C₂H₅ | 5-OCH₃—6-NHCOCH₃ | H | CH₂CH₂CN |
| 2-OCH₃—4-SO₃K | H | 6-CH₂OOCCH₃ | H | CH₂CH₂OC₂H₅ |
| 4-OCH₂CH₂OSO₃K | H | 6-CH₂Cl | H | CH₂CH₂OCH₂CH₂OC₂H₅ |
| 2-SO₃Na—5-Cl | H | 6-CN | H | CH₂Ph |
| 4-Cl | H | 6-OOCCH₃ | CH₃ | CH₂C₆H₁₁ |
| 4-OH | H | 5-COOH | CH₃ | C₆H₄—o-OH |
| 4-CH₂OOCCH₃ | C₃H₇—n | 5-OH | CH₃ | CH₂CH₂OH |
| 4-SO₃K | C₃H₇—n | 5-CH₂CH=CH₂ | C₂H₅ | CH₂CH₂—SO₃K |
| 4-OPh | H | 6-CH₃ | CH₃ | C₆H₄—p-OSO₃K |
| 4-NO₂ | H | 6-COCH₃ | CH₃ | CH₂OPh |
| 5-CN | H | 6-OCH₃ | H | CH₂SO₂NHPh |
| 4-COCH₃ | H | 6-SO₃Na | CH₃ | CH₂SO₂NHCH₃ |
| 5-CH₃ | H | 6-OCH₂CH₂SO₄K | H | C₆H₄—p-SO₂NHCH₃ |
| 5-Ph | H | 6-OCH₂CH₂SO₃K | H | CH₂COOCH₃ |
| 5-OCH₃ | H | 6-CH₃ | H | CH₂SO₂N(CH₃)₂ |
| 4,5-di-Br | H | 6-Ph | H | C₆H₄—p-NHCOOCH₃ |
| 5-COOH | C₄H₉—n | 6-NO₂ | C₂H₅ | CH₂CH₂CONH₂ |
| H | H | 6-OCH₃ | C₂H₅ | C₆H₄—p-CONHCH₃ |
| 4-NO₂ | H | 6-NHCOCH₃ | CH₃ | C₆H₄—p-SCH₃ |
| 4-CN | H | 6-NHSO₂CH₃ | C₃H₇—n | CH₂CH₂SCH₃ |
| 5-COCH₃ | H | 6-COOCH₃ | H | CH₂—C₆H₄—p-SCH₃ |
| 4-COPh | CH₃ | 6-COOH | CH₃ | CH₂SO₂C₂H₅ |
| 2,4-di-COOH | CH₃ | 8-Cl | H | CH₂SO₂Ph |
| 4-OOCCH₃ | CH₃ | 5,6-di-Br | H | CH₂CH₂OSO₃K |
| 4-NHCOCH₃ | CH₃ | 5,6-di-Br | H | C₆H₄—p-OSO₃K |

TABLE 3-continued

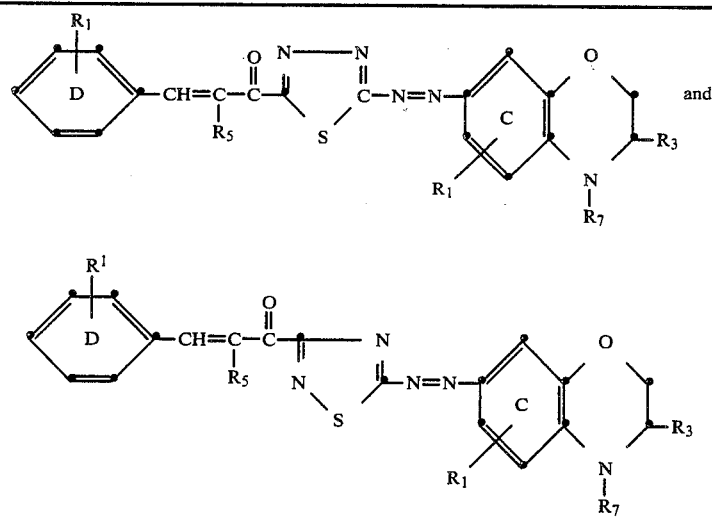

| $R_1$ on D | $R_5$ | $R_1$ on C | $R_3$ | $R_7$ |
| --- | --- | --- | --- | --- |
| 4-NHCOPh | $CH_3$ | 5-OCH$_3$—6-NHCOCH$_3$ | H | $CH_2(C_8H_4O_2N)$ |
| 4-CH$_2$CH=CH$_2$ | H | 6-NHCOCH$_3$ | $C_2H_5$ | $C_2H_5$ |
| H | $CH_3$ | 6-OCPh | $C_2H_5$ | $C_2H_5$ |
| 4-CONH$_2$ | H | 6-CH$_2$CONHCH$_3$ | H | H |
| 3-SO$_2$NH$_2$ | H | 6-CH$_2$CON(CH$_3$)$_2$ | $CH_3$ | Ph |
| 4-SO$_2$NHCH$_3$ | H | 6-CH$_2$CH$_2$OCH$_2$CH$_2$OC$_2$H$_5$ | $C_2H_5$ | $C_6H_{11}$ |
| 4-SO$_2$N(C$_2$H$_5$)$_2$ | H | 6-CH$_2$SC$_2$H$_5$ | H | CH$_2$—CH=CH$_2$ |
| 4-SO$_3$C$_6$H$_5$ | $CH_3$ | 6-CH$_2$SC$_6$H$_5$ | H | CH$_2$OOCC$_2$H$_5$ |
| 4-SCH$_3$ | $CH_3$ | 6-CH$_2$SO$_2$C$_2$H$_5$ | H | C$_6$H$_4$—p-OOCCH$_3$ |
| 2,4-di-SCN | $CH_3$ | 6-CH$_2$SO$_2$C$_6$H$_5$ | H | C$_6$H$_{10}$—4-CH$_3$ |
| 4-SO$_2$C$_6$H$_5$ | $CH_3$ | 6-C$_6$H$_3$—o,p-di-CN | H | CH$_2$CH$_2$—(C$_4$H$_4$O$_2$N) |
| 2-CHO—4-CN | $CH_3$ | 6-C$_6$H$_2$—o,m,p-tri-Cl | $CH_3$ | CH$_2$CH$_2$NO$_2$ |
| 4-CONHC$_2$H$_5$ | $CH_3$ | 6,8-di-OSO$_3$NH(CH$_3$)$_3$ | $CH_3$ | C$_6$H$_4$—p-NO$_2$ |
| 4-CON(C$_2$H$_5$)$_2$ | H | 5,6-di-OSO$_3$Na | $CH_3$ | CH$_2$NHOCCH$_3$ |
| 3-C$_6$H$_{11}$ | H | 5,6-di-OSO$_3$Na | $C_2H_5$ | CH$_2$NHSO$_2$CH$_3$ |
| 3-SC$_6$H$_5$ | H | 5,6-di-SO$_3$NH(CH$_3$)$_3$ | $CH_3$ | C$_6$H$_4$—p-NHOCCH$_3$ |
| 4-NHSO$_2$C$_6$H$_5$ | H | 5,6-di-OSO$_3$Na | $CH_3$ | C$_6$H$_4$—p-NHSO$_2$CH$_3$ |
| 4-SC$_6$H$_{11}$ | H | 6-SC$_6$H$_{11}$ | H | C$_6$H$_{10}$—4-NHOCCH$_3$ |
| 4-C$_6$H$_4$—p-CH$_3$ | $C_2H_5$ | 6-C$_6$H$_4$—p-CH$_3$ | $CH_3$ | CH$_2$CH$_2$Cl |
| 4-C$_6$H$_4$—p-CH$_2$CH=CH$_2$ | $C_2H_5$ | 6-C$_6$H$_4$—p-CH$_2$CH=CH$_2$ | $C_2H_5$ | C$_6$H$_4$—p-Br |
| 4-OCH$_2$CH$_2$NO$_2$ | $C_2H_5$ | 6-OCH$_2$CH$_2$NO$_2$ | H | C$_6$H$_4$—p-CN |
| 2-CH$_2$NHCOCH$_3$ | $C_2H_5$ | 6-CN$_2$NHCOCH$_3$ | H | CH$_2$CH$_2$CN |
| 4-CH$_2$NHSO$_2$C$_2$H$_5$ | H | 6-CH$_2$NHSO$_2$C$_2$H$_5$ | H | CH$_2$CH$_2$OC$_2$H$_5$ |
| 4-CH$_2$CH$_2$Cl | H | 6-CH$_2$CH$_2$Cl | H | CH$_2$CH$_2$OCH$_2$CH$_2$OC$_2$H$_5$ |
| 2,6-di-CH$_2$CN | H | 5,6-di-CH$_2$CN | H | CH$_2$Ph |
| 4-CH$_2$CH$_2$OC$_2$H$_5$ | H | 6-CH$_2$CH$_2$OC$_2$H$_5$ | $CH_3$ | CH$_2$C$_6$H$_{11}$ |
| 4-CH$_2$C$_6$H$_5$ | H | 6-COOH | $CH_3$ | C$_6$H$_4$—o-OH |
| 4-CH$_2$C$_6$H$_{11}$ | C$_3$H$_7$—n | 6-CH$_2$C$_6$H$_{11}$ | $CH_3$ | CH$_2$CH$_2$OH |
| 4-CH$_2$CH(OH)CH$_2$OH | C$_3$H$_7$—n | 6-CH$_2$CH(OH)CH$_2$OH | $C_2H_5$ | CH$_2$CH$_2$—SO$_3$K |
| 4-CH$_2$CH$_2$—SO$_3$K | H | 6-CH$_2$CH$_2$—SO$_3$K | $CH_3$ | C$_6$H$_4$—p-OSO$_3$K |
| 4-CH$_2$OC$_6$H$_5$ | H | 6-CH$_2$OC$_6$H$_5$ | $CH_3$ | CH$_2$OPh |
| 4-CH$_2$OOCC$_6$H$_5$ | H | 6-CH$_2$OOCC$_6$H$_5$ | H | CH$_2$SO$_2$NHPh |
| 5-CH$_2$COOCH$_3$ | H | 5-CH$_2$COOCH$_3$ | $CH_3$ | CH$_2$SO$_2$NHCH$_3$ |
| 4-C$_6$H$_4$—p-SO$_2$N(C$_2$H$_5$)$_2$ | H | 6-C$_6$H$_4$—p-SO$_2$N(C$_2$H$_5$)$_2$ | H | C$_6$H$_4$—p-SO$_2$NHCH$_3$ |
| 4-CH$_2$CH$_2$NHCOOCH$_3$ | H | 6-CH$_2$CH$_2$NHCOOCH$_3$ | H | CH$_2$COOCH$_3$ |
| 4-CH$_2$NHCONHCH$_3$ | H | 6-CH$_2$NHCONHCH$_3$ | H | CH$_2$SO$_2$N(CH$_3$)$_2$ |
| 4-CH$_2$CONH$_2$ | H | 6-CH$_2$CONH$_2$ | H | C$_6$H$_4$—p-NHCOOCH$_3$ |
| 5-CH$_2$CONHCH$_3$ | C$_4$H$_9$—n | 6-CONH$_2$ | $C_2H_5$ | CH$_2$CH$_2$CONH$_2$ |
| 4-CH$_2$CON(CH$_3$)$_2$ | H | 6-SO$_2$NH$_2$ | $C_2H_5$ | C$_6$H$_4$—p-CONHCH$_3$ |
| 4-CH$_2$CH$_2$OCH$_2$CH$_2$OC$_2$H$_5$ | H | 6-SO$_2$NHCH$_3$ | $CH_3$ | C$_6$H$_4$—p-SCH$_3$ |
| 4-CH$_2$SC$_2$H$_5$ | H | 6-SO$_2$N(C$_2$H$_5$)$_2$ | C$_3$H$_7$—n | CH$_2$CH$_2$SCH$_3$ |

TABLE 3-continued

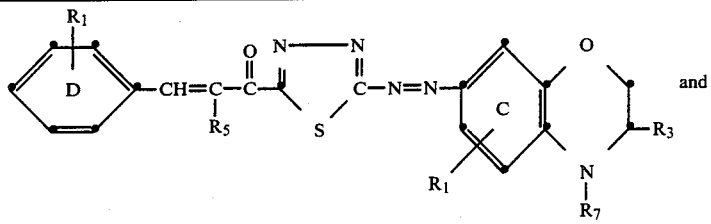

and

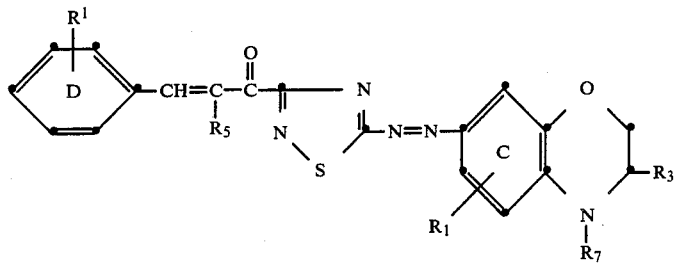

| $R_1$ on D | $R_5$ | $R_1$ on C | $R_3$ | $R_7$ |
|---|---|---|---|---|
| 5-CH$_2$SC$_6$H$_5$ | H | 6-SO$_3$C$_6$H$_5$ | H | CH$_2$—C$_6$H$_4$—p-SCH$_3$ |
| 4-CH$_2$SO$_2$C$_2$H$_5$ | CH$_3$ | 6-SCH$_3$ | CH$_3$ | CH$_2$SO$_2$C$_2$H$_5$ |
| 2,4-di-CH$_2$SO$_2$C$_6$H$_5$ | CH$_3$ | 5,6-di-SCN | H | CH$_2$SO$_2$Ph |
| 4-C$_6$H$_3$—o,p-di-CN | CH$_3$ | 6-SO$_2$C$_6$H$_5$ | H | CH$_2$CH$_2$OSO$_3$K |
| 4-C$_6$H$_2$—o,m,p-tri-Cl | CH$_3$ | 5-CHO—6-CN | H | C$_6$H$_4$—p-OSO$_3$K |
| 2,6-di-OSO$_3$Na | CH$_3$ | 6-CONHC$_2$H$_5$ | H | CH$_2$—(C$_8$H$_4$O$_2$N) |
| H | H | 6-CON(C$_2$H$_5$)$_2$ | H | C$_2$H$_5$ |
| H | H | 6-C$_6$H$_{11}$ | H | C$_2$H$_5$ |
| 5-CH$_2$(C$_8$H$_4$O$_2$N) | H | 6-SC$_6$H$_5$ | H | C$_2$H$_5$ |
| 5-CH$_2$(C$_4$H$_3$O) | H | 6-NHSO$_2$C$_6$H$_5$ | H | C$_2$H$_5$ |

TABLE 4

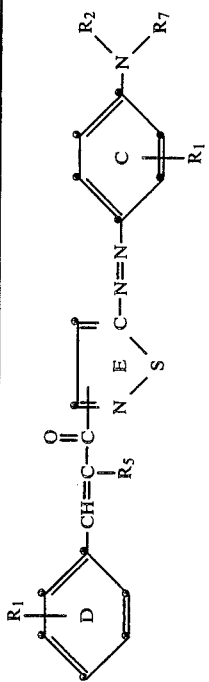

| Cinnamoyl Group Position | $R_1$ on D | $R_5$ | Substituents on E | $R_1$ on C | $R_2$ | $R_7$ |
|---|---|---|---|---|---|---|
| 4 | H | H | H | H | H | H |
| 4 | 4-$NO_2$ | H | $COCH_3$ | 2-$CH_3$ | $C_2H_5$ | Ph |
| 4 | 4-CN | H | $NO_2$ | 5-$COCH_3$ | $C_2H_5$ | $CH_2$—CH=$CH_2$ |
| 4 | 5-$COCH_3$ | $CH_3$ | Cl | 5-$OCH_3$ | H | $CH_2OOCC_2H_5$ |
| 4 | 4-COPh | $CH_3$ | CN | 5-$SO_3Na$ | H | $C_6H_4$—p-$OOCCH_3$ |
| 4 | 2,4-di-COOH | $CH_3$ | $NHSO_2CH_3$ | 5-$OCH_2CH_2SO_4K$ | H | $C_6H_{10}$—4-$CH_3$ |
| 4 | 4-$OOCCH_3$ | $CH_3$ | $CH_3$ | 5-$OCH_2CH_2SO_4N$ H(Et)$_3$ | H | $CH_2CH(C_4H_4O_2N)$ |
| 3,4 | 4-$NHCOCH_3$ | $CH_3$ |  | 2-$CH_3$ | $CH_3$ | $CH_2CH_2NO_2$ |
| 4 | 4-NHCOPh | $CH_3$ | Ph | 2-Ph | $CH_3$ | $C_6H_4$—p-$NO_2$ |
| 3 | 4-$C_2H_5$ | $CH_3$ | H | 2-$NO_2$ | $CH_3$ | $CH_2NHOCCH_3$ |
| 3 | 4-Ph | H | H | 2-$OCH_3$ | $CH_3$ | $CH_2NHSO_2CH_3$ |
| 3 | 2,5-di-Cl | H | $SO_3Na$ | 5-$NHCOCH_3$ | $C_2H_5$ | $C_6H_4$—p-$NHOCCH_3$ |
| 4 | 2-Cl—4-$SO_2CH_3$ | H | $SO_3Na$ | 3-$NHSO_2CH_3$ | $C_2H_5$ | $C_6H_4$—p-$NHSO_2CH_3$ |
| 4 | 4-$NHSO_2CH_3$ | H | $OCH_2CH_2SO_3K$ | 3-COOH | $C_2H_5$ | $C_6H_{10}$—4-$NHOOCH_3$ |
| 4 | 4-$COOCH_3$ | H | $OCH_2CH_2SO_4K$ | 3-COOH | $C_2H_5$ | $CH_2CH_2Cl$ |
| 4 | 2-$OCH_3$ | $C_2H_5$ | $NHCOPh$ | 2-Cl | $CH_2CH_2Cl$ | $C_6H_4$—p-Br |
| 4 | 4-$SO_3Na$ | $C_2H_5$ | $NHCOCH_3$ | 2,6-di-Br | $C_6H_4$—p-Br | $C_6H_4$—p-CN |
| 4 | 2-$SO_3Na$ | $C_2H_5$ | $NHCOCH_3$ | 2,6-di-Br | $C_6H_4$—p-CN | $CH_2CH_2CN$ |
| 4 | 2-$OCH_3$—4-$SO_3K$ | H | $OOCC_2H_5$ | 2-$OCH_3$—5-$NHCOCH_3$ | $CH_2CH_2CN$ | $CH_2CH_2OC_2H_5$ |
| 4 | 4-$OCH_2CH_2OSO_3K$ | H | COOH | 2-$CH_2OOCCH_3$ | $CH_2CH_2OC_2H_5$ | $CH_2CH_2OCH_2CH_2OC_2H_5$ |
| 4 | 2-$SO_3Na$—5-Cl | H | H | 2-$CH_2Cl$ | $CH_2Ph$ | $CH_2Ph$ |
| 4 | 4-Cl | H | $SO_2CH_3$ | 2-CN | $CH_2C_6H_{11}$ | $C_6H_{11}$ |
| 4 | 4-OH | $C_3H_7$—n | $CF_3$ | 2-$OOCCH_3$ | H | $C_6H_4$—o-OH |
| 3,4 | 4-$CH_2OOCCH_3$ | $C_3H_7$—n | $COOCH_3$ | 5-COOH | $C_2H_5$ | $CH_2CH_2OH$ |
| 3 | 4-$SO_3K$ | H |  | 5-OH | $CH_2CH_2$—$SO_3K$ | $CH_2CH_2$—$SO_3K$ |
| 4 | 4-OPh | H | $CONH_2$ | 2-$CH_3$ | H | $C_6H_4$—p-$OSO_3K$ |
| 4 | 4-$NO_2$ | H | $CONHCH_3$ | 5-$COCH_3$ | H | $CH_2OPh$ |
| 4 | 5-CN | H | $CH_2Ph$ | 5-$OCH_3$ | $CH_3SO_2NHCH_3$ | $CH_2SO_2NHPh$ |
| 4 | 4-$COCH_3$ | H | $CH_2SO_3K$ | 5-$SO_3Na$ | H | $CH_2SO_2NHCH_3$ |
| 4 | 5-$CH_3$ | H | $CH_2OSO_3K$ | 5-$OCH_2CH_2SO_3K$ | $CH_2COOCH_3$ | $C_6H_4$—p-$SO_2NHCH_3$ |
| 4 | 5-Ph | H | $C_6H_4$—p-$SO_3K$ | 5-$OCH_2CH_2SO_3K$ | H | $CH_2COOCH_3$ |
| 4 | 5-$OCH_3$ | $C_4H_9$—n | $CH_2CH_2OH$ | 2-$CH_3$ | H | $C_6H_4$—p-$SO_2N(CH_3)_2$ |
| 4 | 4,5-di-Br | H | $C_6H_4$—p-Br | 2-Ph | $C_2H_5$ | $C_6H_4$—p-$NHCOCH_3$ |
| 4 | 5-COOH | H | H | 2-$NO_2$ | $C_2H_5$ | $CH_2CH_2CONH_2$ |
| 4 | H | H | $COCH_3$ | 2-$OCH_3$ | $C_2H_5$ | $C_6H_4$—p-$CONHCH_3$ |
| 4 | 4-$NO_2$ | H | $NO_2$ | 5-$NHCOCH_3$ | $CH_2CH_2SCH_3$ | $C_6H_4$—p-$SCH_3$ |
| 4 | 4-CN | $CH_3$ | Cl | 3-$NHSO_2CH_3$ | H | $CH_2SCH_3$ |
| 4 | 5-$COCH_3$ | $CH_3$ | CN | 3-COOH | $CH_2SO_2C_2H_5$ | $CH_2$—$C_6H_4$—p-$SCH_3$ |
| 4 | 4-COPh | $CH_3$ | $NHSO_2CH_3$ | 3-COOH | H | $CH_2SO_2C_2H_5$ |
| 4 | 2,4-di-COOH | $CH_3$ | $NHSO_2CH_3$ | 2-Cl | H | $CH_2SO_2Ph$ |

TABLE 4-continued

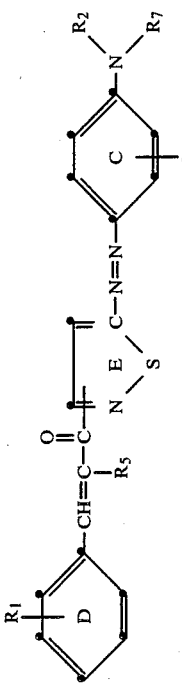

| Cinnamoyl Group Position | $R_1$ on D | $R_5$ | Substituents on E | $R_1$ on C | $R_2$ | $R_7$ |
|---|---|---|---|---|---|---|
| 4 | 4-OOCCH$_3$ | CH$_3$ | CH$_3$ | 2,6-di-Br | H | CH$_2$CH$_2$OSO$_3$K |
| 4 | 4-NHCOCH$_3$ | CH$_3$ | OCH$_3$ | 2,6-di-Br | H | C$_6$H$_4$—p-OSO$_3$K |
| 4 | 4-NHCOPh | CH$_3$ | Ph | 2-OCH$_3$—5-NHCOCH$_3$ | H | CH$_2$(C$_8$H$_4$O$_2$N) |
| 4 | 4-CH$_2$CH=CH$_2$ | H | H | 3-NHCOCH$_3$ | C$_2$H$_5$ | C$_2$H$_5$ |
| 3,4 | H | CH$_3$ | CH$_3$ | 3-OCPh | C$_2$H$_5$ | H |
| 3 | 4-CONH$_2$ | H | H | 5-CH$_2$CONHCH$_3$ | C$_2$H$_4$ | Ph |
| 3 | 3-SO$_2$NH$_2$ | H | COCH$_3$ | 5-CH$_2$CON(CH$_3$)$_2$ | H | C$_6$H$_{11}$ |
| 3 | 4-SO$_2$NHCH$_3$ | H | NO$_2$ | 5-CH$_2$CH$_2$OCH$_2$CH$_2$OC$_2$H$_5$ | H | CH$_2$—CH=CH$_2$ |
| 3 | 4-SO$_2$N(C$_2$H$_5$)$_2$ | CH$_3$ | Cl | 5-CH$_2$SC$_2$H$_5$ | H | CH$_2$OOCC$_2$H$_5$ |
| 3 | 4-SO$_3$C$_6$H$_5$ | CH$_3$ | CN | 2-CH$_2$S$_2$C$_6$H$_5$ | H | C$_6$H$_4$—p-OOCCH$_3$ |
| 3 | 4-SCH$_3$ | CH$_3$ | NHSO$_2$CH$_3$ | 5-CH$_2$SO$_2$C$_2$H$_5$ | CH$_3$ | C$_6$H$_{10}$—4-CH$_3$ |
| 4 | 2,4-di-SCN | CH$_3$ | CH$_3$ | 5-CH$_2$SO$_2$C$_6$H$_5$ | CH$_3$ | CH$_2$NH$_2$(C$_4$H$_4$O$_2$N) |
| 4 | 4-SO$_2$C$_6$H$_5$ | CH$_3$ | OCH$_3$ | 5-C$_6$H$_3$—o,p-di-CN | CH$_3$ | CH$_2$CH$_2$NO$_2$ |
| 4 | 2-CHO-4-CN | H | Ph | 5-C$_6$H$_2$—o,m,p-tri-Cl | CH$_3$ | C$_6$H$_4$—p-NO$_2$ |
| 4 | 4-CONHC$_2$H$_5$ | H | H | 2,6-di-OSO$_3$N H(CH$_3$)$_3$ | CH$_3$ | CH$_2$NHOCCH$_3$ |
| 4 | 4-CON(C$_2$H$_5$)$_2$ | H | H | 2,6-di-SO$_3$N H(CH$_3$)$_3$ | CH$_3$ | CH$_2$NHSO$_2$CH$_3$ |
| 4 | 3-C$_6$H$_{11}$ | H | SO$_3$Na | 2,6-di-OSO$_3$K | C$_2$H$_5$ | C$_6$H$_4$—p-NHOCCH$_3$ |
| 4 | 3-SC$_6$H$_5$ | H | SO$_3$Na | 2-SO$_3$N H(CH$_3$)$_3$ | C$_2$H$_5$ | C$_6$H$_4$—p-NHSO$_2$CH$_3$ |
| 4 | 4-NHSO$_2$C$_6$H$_5$ | H | OCH$_2$CH$_2$SO$_4$K | 2-OSO$_3$N H(CH$_3$)$_3$ | C$_2$H$_5$ | C$_6$H$_{10}$—4-NHOCCH$_3$ |
| 4 | 4-SC$_6$H$_{11}$ | H | OCH$_2$CH$_2$SO$_4$K | 5-SC$_6$H$_{11}$ | C$_2$H$_5$ | CH$_2$CH$_2$Cl |
| 4 | 4-C$_6$H$_4$—p-CH$_3$ | C$_2$H$_5$ | NHCOPh | 5-C$_6$H$_4$—p-CH$_3$ | CH$_2$CH$_2$Cl | C$_6$H$_4$—p-Br |
| 4 | 4-C$_6$H$_4$—p-CH$_2$CH=CH$_2$ | C$_2$H$_5$ | NHCOPh | 5-C$_6$H$_4$—p-CH$_2$CH=CH$_2$ | C$_6$H$_4$—p-Br | C$_6$H$_4$—p-CN |
| 4 | 4-OCH$_2$CH$_2$NO$_2$ | C$_2$H$_5$ | NHCOC$_2$H$_5$ | 5-OCH$_2$CH$_2$NO$_2$ | C$_6$H$_4$—p-CN | CH$_2$CN |
| 4 | 2-CH$_2$NHSO$_2$C$_2$H$_5$ | H | OOCC$_2$H$_5$ | 2-CH$_2$NHSO$_2$C$_2$H$_5$ | CH$_2$CH$_2$OC$_2$H$_5$ | CH$_3$CH$_2$OC$_2$H$_5$ |
| 4 | 4-CH$_2$NHSO$_2$C$_2$H$_5$ | H | COOH | 5-CH$_2$NHSO$_2$C$_2$H$_5$ | CH$_2$CH$_2$OCH$_2$CH$_2$OC$_2$H$_5$ | CH$_2$CH$_2$OCH$_2$CH$_2$OC$_2$H$_5$ |
| 4 | 4-CH$_2$CH$_2$Cl | H | H | 5-CH$_2$CH$_2$Cl | CH$_2$Ph | CH$_2$Ph |
| 2,6-di-CH$_2$CN | | H | H | 2,6-di-CH$_2$CN | CH$_2$C$_6$H$_{11}$ | CH$_2$C$_6$H$_{11}$ |
| 4 | 4-C$_6$H$_5$ | H | SO$_2$CH$_3$ | 5-COOH | H | C$_6$H$_4$—o-OH |
| 4 | 4-C$_6$H$_{11}$ | H | CH$_2$C$_6$H$_5$ | 5-CH$_2$C$_6$H$_{11}$ | C$_2$H$_5$ | CH$_2$CH$_2$OH |
| 4 | 4-CH$_2$CH(OH)CH$_2$OH | C$_3$H$_7$—n | COOCH$_3$ | 5-CH$_2$CH(OH)CH$_2$OH | H | CH$_2$CH$_2$—SO$_3$K |
| 4 | 4-CH$_2$CH$_2$—SO$_3$K | C$_3$H$_7$—n | CHO | 5-CH$_2$CH$_2$—SO$_3$K | H | C$_6$H$_4$—p-OSO$_3$K |
| 4 | 4-CH$_2$OC$_2$H$_5$ | H | CONH$_2$ | 5-CH$_2$OC$_2$H$_5$ | H | CH$_2$OPh |
| 4 | 4-CH$_2$OOCC$_6$H$_5$ | H | CONHCH$_3$ | 5-CH$_2$OOCC$_6$H$_5$ | H | CH$_2$SO$_2$NHPh |
| 5 | 5-CH$_2$COOCH$_3$ | H | CH$_2$Ph | 5-CH$_2$COOCH$_3$ | CH$_2$SO$_2$NHCH$_3$ | CH$_2$SO$_2$NHCH$_3$ |
| 4 | 4-C$_6$H$_4$—p-SO$_2$N(C$_2$H$_5$)$_2$ | H | CH$_2$SO$_3$K | 5-C$_6$H$_4$—p-SO$_2$N(C$_2$H$_5$)$_2$ | H | C$_6$H$_4$—p-SO$_2$NHCH$_3$ |
| 4 | 4-CH$_2$CH$_2$NHCOOCH$_3$ | H | CH$_2$OSO$_3$K | 5-CH$_2$CH$_2$NHCOOCH$_3$ | CH$_2$COOCH$_3$ | CH$_2$COOCH$_3$ |
| 4 | 4-CH$_2$NH$_2$CONHCH$_3$ | H | C$_6$H$_4$—p-SO$_3$K | 5-CH$_2$NH$_2$CONHCH$_3$ | H | C$_6$H$_4$—p-SO$_2$NHCH$_3$ |
| 3 | 4-CH$_2$CONH$_2$ | C$_4$H$_9$—n | CH$_2$CH$_2$OH | 5-CH$_2$CONH$_2$ | C$_2$H$_5$ | CH$_2$COOCH$_3$ |
| 3 | 5-CH$_2$CONHCH$_3$ | H | CH$_2$Cl | 5-CONH$_2$ | C$_2$H$_5$ | C$_6$H$_4$—p-NHCOOCH$_3$ |
| 3 | 4-CH$_2$CON(CH$_3$)$_2$ | H | C$_6$H$_4$—p-Br | 3-SO$_2$NHCH$_3$ | C$_2$H$_5$ | CH$_2$CH$_2$CONH$_2$ |
| 3 | | H | H | | C$_2$H$_5$ | C$_6$H$_4$—p-CONHCH$_3$ |

TABLE 4-continued

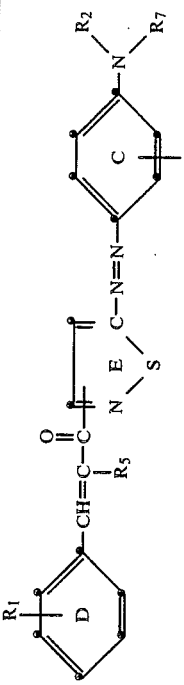

| Cinnamoyl Group Position | R1 on D | R5 | Substituents on E | R1 on C | R2 | R7 |
|---|---|---|---|---|---|---|
| 3 | 4-$CH_2CH_2OCH_2CH_2OC_2H_5$ | H | $COCH_3$ | 5-$SO_2NHCH_2$ | $C_6H_5$ | $C_6H_4$—p-$SCH_3$ |
| 3,4 | 4-$CH_2SC_2H_5$ | H | Cl | 5-$SO_2N(C_2H_5)_2$ | $CH_2CH_2SCH_3$ | $CH_2CH_2SCH_3$ |
| 4 | 5-$CH_2SC_6H_5$ | H | CN | 5-$SO_3C_6H_5$ | H | $CH_2$—$C_6H_4$—p-$SCH_3$ |
| 4 | 4-$CH_2SO_2C_2H_5$ | $CH_3$ | $NHSO_2CH_3$ | 5-$SCH_3$ | $CH_2SO_2C_2H_5$ | $CH_2SO_2C_2H_5$ |
| 4 | 2,4-di-$CH_2SO_2C_6H_5$ | $CH_3$ | $CH_3$ | 2,5-di-SCN | H | $CH_3SO_2Ph$ |
| 4 | 4-$C_6H_3$—o,p-di-CN | $CH_3$ | $OCH_3$ | 5-$SO_2C_6H_5$ | H | $CH_2OSO_3K$ |
| 4 | 4-$C_6H_2$—o,m,p-tri-Cl | $CH_3$ | Ph | 2-CHO—6-CN | H | $C_6H_4$—p-$OSO_3K$ |
| 4 | 2,6-di-$OSO_3Na$ | H | $CH_2(C_4H_4O_2N)$ | 5-$CONHC_2H_5$ | H | $CH_2$—($C_8H_4O_2N$) |
| 4 | H | H | $CH_2(C_4H_3O)$ | 5-$CON(C_2H_5)_2$ | $C_2H_5$ | $C_2H_5$ |
| 4 | H | H | H | 3-$C_6H_{11}$ | $C_2H_5$ | $C_2H_5$ |
| 4 | 5-$CH_2(C_8H_4O_2N)$ | H | H | 3-$SC_6H_5$ | $C_2H_5$ | $C_2H_5$ |
| 4 | 5-$CH_2(C_4H_3O)$ | H | H | 6-$NHSO_2C_6H_5$ | $C_2H_5$ | $C_2H_5$ |

TABLE 5

| Cinnamoyl Group Position | R1 on D | R5 | Substituents on E | R1 on C | R3 | R4 | R8 | R7 |
|---|---|---|---|---|---|---|---|---|
| 4 | H | H | H | H | CH3 | H | H | H |
| 4 | 4-NO2 | H | COCH3 | 7-CH3 | CH3 | CH3 | CH3 | Ph |
| 4 | 4-CN | H | NO2 | 5-COCH3 | CH3 | CH3 | H | C6H11 |
| 4 | 5-COCH3 | CH3 | Cl | 5-OCH3 | CH3 | CH3 | H | CH2—CH=CH2 |
| 4 | 4-COPh | CH3 | CN | 7-SO3Na | CH3 | CH3 | H | CH2OOCC2H5 |
| 4 | 2,4-di-COOH | CH3 | NHSO2CH3 | 7-OCH2CH2SO4K | CH3 | H | H | C6H4—p-OOCCH3 |
| 4 | 4-OOCCH3 | CH3 | CH3 | 7-OCH2CH2SO4NH(Et)3 | CH3 | H | H | C6H10—4-CH3 |
| 3,4 | 4-NHCOCH3 | CH3 | Ph | 7-CH3 | CH3 | H | H | CH2CH2(C4H4O2N) |
| 3 | 4-NHCOPh | CH3 | H | 7-Ph | CH3 | H | H | CH2CH2NO2 |
| 3 | 4-C2H5 | H | H | 7-NO2 | CH3 | H | H | C6H4—p-NO2 |
| 3 | 4-Ph | H | SO3Na | 7-OCH3 | CH3 | H | H | CH2NHOCCH3 |
| 3 | 2,5-di-Cl | H | SO3Na | 7-NHCOCH3 | CH3 | H | H | CH2NHSO2CH3 |
| 4 | 2-Cl—4-SO2CH3 | H | OCH2CH2SO4K | 7-NHSO2CH3 | CH3 | CH3 | H | C6H4—p-NHOCCH3 |
| 4 | 2-NHSO2CH3 | H | OCH2CH2SO4K | 7-COOCH3 | CH3 | C2H5 | C2H5 | C6H4—p-NHSO2CH3 |
| 4 | 4-COOCH3 | C2H5 | NHCOPh | 7-COOH | H | CH3 | CH3 | C6H10—4-NHOCCH3 |
| 4 | 2-OCH3 | C2H5 | NHCOCH3 | 7-Cl | CH3 | CH3 | H | CH2CH2Cl |
| 4 | 4-OC2H5 | C2H5 | NHCOCH3 | 5,7-di-Br | CH3 | CH3 | H | C6H4—p-Br |
| 4 | 4-SO3Na | H | OOCC2H5 | 5,7-di-Br | CH3 | CH3 | H | C6H4—p-CN |
| 2 | 2-SO3Na | H | COOH | 5-OCH3—7-NHCOCH3 | CH3 | CH3 | H | CH2CH2CN |
| 4 | 2-OCH3—4-SO3K | H | H | 7-CH2OOCCH3 | CH3 | CH3 | H | CH2CH2OC2H5 |
| 4 | 4-OCH2CH2OSO3K | H | SO2CH3 | 7-CH2Cl | CH3 | CH3 | H | CH2CH2OCH2CH2OC2H5 |
| 4 | 2-SO3Na—5-Cl | H | CF3 | 7-CN | CH3 | CH3 | H | CH2Ph |
| 4 | 4-Cl | H | COOCH3 | 7-OOCCH3 | CH3 | CH3 | H | CH2C6H11 |
| 4 | 4-OH | C3H7—n | CONH2 | 5-COOH | CH3 | CH3 | H | C6H4—9-OH |
| 4 | 4-CH2OOCCH3 | C3H7—n | CONHCH3 | 5-OH | CH3 | CH3 | H | CH2CH2OH |
| 3,4 | 4-SO3K | H | CH2Ph | 5-CH2CH=CH2 | CH3 | H | H | CH2CH2—SO3K |
| 3 | 4-OPh | H | CH2SO3K | 7-CH3 | CH3 | H | H | C6H4—p-OSO3K |
| 4 | 4-NO2 | H | CONHCH3 | 7-OCH3 | CH3 | H | C2H5 | CH2OPh |
| 4 | 5-CN | H | CH2OSO3K | 7-COCH3 | CH3 | C2H5 | H | CH2SO2NHPh |
| 4 | 4-COCH3 | H | CH2OSO3K | 7-SO3Na | CH3 | CH3 | H | CH2SO2NHCH3 |
| 4 | 5-CH3 | H | C6H4—p-SO3K | 7-OCH2CH2SO3K | CH3 | CH3 | H | C6H4—p-SO2NHCH3 |
| 4 | 5-Ph | H | C6H4—p-SO3K | 7-OCH2CH2SO3K | CH3 | CH3 | CH3 | CH2COOCH3 |
| 4 | 5-OCH3 | C4H9—n | CH2CH2OH | 7-CH3 | CH3 | CH3 | H | CH2SO2N(CH3)2 |
| 4 | 4,5-di-Br | H | C6H4—p-Br | 7-Ph | H | H | H | C6H4—p-NHCOCH3 |
| 4 | 5-COOH | H | H | 7-NO2 | CH3 | CH3 | H | C6H4—p-CONHCH3 |
| 4 | H | H | COCH3 | 7-OCH3 | CH3 | CH3 | CH3 | CH2CH2CONH2 |
| 4 | 4-NO2 | H | NO2 | 7-NHCOCH3 | CH3 | CH3 | H | C6H4—p-SCH3 |
| 4 | 4-CN | H | H | 7-NHSO2CH3 | CH3 | CH3 | H | C6H4—CH2SCH3 |
| 4 | 5-COCH3 | H | Cl | 7-COOCH3 | CH3 | CH3 | H | CH2—C6H4—p-SCH3 |

TABLE 5-continued

| Cinnamoyl Group Position | $R_1$ on D | $R_5$ | Substituents on E | $R_1$ on C | $R_3$ | $R_4$ | $R_8$ | $R_7$ |
|---|---|---|---|---|---|---|---|---|
| 4 | COPh | $CH_3$ | CN | 7-COOH | $CH_3$ | $CH_3$ | H | $CH_2SO_2C_2H_5$ |
| 4 | 2,4-di-COOH | $CH_3$ | $NHSO_2CH_3$ | 7-Cl | $CH_3$ | $CH_3$ | H | $CH_2SO_2Ph$ |
| 4 | 4-OOCCH$_3$ | $CH_3$ | $CH_3$ | 5,7-di-Br | $CH_3$ | H | H | $C_6H_4CH_2OSO_3K$ |
| 4 | 4-NHCOCH$_3$ | $CH_3$ | $OCH_3$ | 5,7-di-Br | $CH_3$ | H | H | $C_6H_4$—p-OSO$_3$K |
| 4 | 4-NHCOPh | $CH_3$ | Ph | 5-OCH$_3$—7-NHCOCH$_3$ | $CH_3$ | H | H | $CH_2(C_8H_4O_2N)$ |
| 4 | 4-CH$_2$CH=CH$_2$ | $CH_3$ | H | 7-NHCOCH$_3$ | $C_2H_5$ | H | H | $C_2H_5$ |
| 3,4 | H | $CH_3$ | — | 7-OCPh | $C_2H_5$ | H | H | $C_2H_5$ |
| 3 | 4-CONH$_2$ | H | H | 7-CH$_2$CONHCH$_3$ | H | H | H | H |
| 3 | 3-SO$_2$NH$_2$ | H | COCH$_3$ | 7-CH$_3$CON(CH$_3$)$_2$ | $CH_3$ | $CH_3$ | $CH_3$ | Ph |
| 3 | 4-SO$_2$NHCH$_3$ | $CH_3$ | NO$_2$ | 7-CH$_2$CH$_2$OCH$_2$CH$_2$OC$_2$H$_5$ | $CH_3$ | $CH_3$ | H | $C_6H_{11}$ |
| 3 | 4-SO$_2$N(C$_2$H$_5$)$_2$ | $CH_3$ | Cl | 7-CH$_2$SC$_6$H$_5$ | $CH_3$ | $CH_3$ | H | $CH_2$—CH=CH$_2$ |
| 3 | 4-SO$_3$C$_6$H$_5$ | $CH_3$ | CN | 7-CH$_2$SC$_2$H$_5$ | $CH_3$ | $CH_3$ | H | $CH_2OOCC_2H_5$ |
| 3 | 4-SCH$_3$ | $CH_3$ | NHSO$_2$CH$_3$ | 7-CH$_2$SO$_2$C$_2$H$_5$ | $CH_3$ | $CH_3$ | H | $C_6H_4$—p-OOCCH$_3$ |
| 3 | 2,4-di-C$_6$H$_5$ | $CH_3$ | OCH$_3$ | 7-CH$_2$SO$_2$C$_6$H$_5$ | $CH_3$ | $CH_3$ | H | $C_6H_{10}$—4-CH$_3$ |
| 4 | 4-SO$_2$C$_6$H$_5$ | $CH_3$ | Ph | 7-C$_6$H$_3$—o,p-di-CN | $CH_3$ | H | $CH_3$ | $CH_2CH_2$—(C$_4$H$_4$O$_2$N) |
| 2 | 2-CHO—4-CN | $CH_3$ | H | 7-C$_6$H$_2$—o,m,p-tri-Cl | $CH_3$ | H | H | $CH_2NO_2$ |
| 4 | 4-CONHC$_2$H$_5$ | $CH_3$ | SO$_3$Na | 5,7-di-OSO$_3$NH(CH$_3$)$_3$ | $CH_3$ | H | H | $C_6H_4$—p-NO$_2$ |
| 4 | 4-CON(C$_2$H$_5$)$_2$ | H | SO$_3$Na | 5,7-di-SO$_3$NH(CH$_3$)$_2$ | $CH_3$ | H | H | $CH_2NHOCCH_3$ |
| 3 | 3-C$_6$H$_{11}$ | H | OCH$_2$CH$_2$SO$_4$K | 7-OSO$_3$NH(CH$_3$)$_3$ | $CH_3$ | $CH_3$ | H | $C_6H_4$—p-NHSO$_2$CH$_3$ |
| 3 | 3-SC$_6$H$_5$ | H | OCH$_2$CH$_2$SO$_4$K | 5,7-di-OSO$_3$Na | $CH_3$ | $CH_3$ | H | $C_6H_{10}$—4-NHCOCH$_3$ |
| 4 | 4-NHSO$_2$C$_6$H$_5$ | $C_2H_5$ | NHCOPh | 7-C$_6$H$_4$—p-CH$_3$ | $CH_3$ | $CH_3$ | $C_2H_5$ | $CH_2CH_2Cl$ |
| 4 | 4-SC$_6$H$_{11}$ | $C_2H_5$ | NHCOPh | 7-C$_6$H$_4$—p-CH$_2$CH=CH$_2$ | H | H | $CH_3$ | $C_6H_4$—p-Br |
| 4 | 4-C$_6$H$_4$—p-CH$_3$ | $C_2H_5$ | NHCOCH$_3$ | 7-CH$_2$CH$_2$NO$_2$ | $CH_3$ | $CH_3$ | H | $C_6H_4$—p-CN |
| 4 | 4-C$_6$H$_4$—p-CH$_2$CH=CH$_2$ | $C_2H_5$ | OCH$_2$COCH$_3$ | 7-CH$_2$NHCOCH$_3$ | $CH_3$ | $CH_3$ | H | $CH_2CH_2CN$ |
| 4 | 4-OCH$_2$CH$_2$NO$_2$ | $C_2H_5$ | OOCC$_2$H$_5$ | 7-CH$_2$NHSO$_2$C$_2$H$_5$ | $CH_3$ | $CH_3$ | H | $CH_2CH_2CN$ |
| 2 | 2-CH$_2$NHCOCH$_3$ | H | COOH | 7-CH$_2$CH$_2$CN | $CH_3$ | $CH_3$ | H | $CH_2CH_2OC_2H_5$ |
| 4 | 4-CH$_2$CH$_2$Cl | H | H | 5,7-di-CH$_2$CN | $CH_3$ | $CH_3$ | H | $CH_2CH_2OCH_2CH_2OC_2H_5$ |
| 2 | 2,6-di-CH$_2$CN | H | SO$_2$CH$_3$ | 7-COOH | $CH_3$ | $CH_3$ | H | $C_6H_2Ph$ |
| 4 | 4-CH$_2$C$_6$H$_5$ | H | CH$_2$C$_6$H$_5$ | 7-CH$_2$CH$_2$OC$_2$H$_5$ | $CH_3$ | $CH_3$ | H | $C_6H_4C_6H_{11}$ |
| 4 | 4-CH$_2$C$_6$H$_{11}$ | $C_3H_7$—n | COOCH$_3$ | 7-CH$_2$C$_6$H$_{11}$ | $CH_3$ | $CH_3$ | H | $C_6H_4$—o-OH |
| 4 | 4-CH$_2$CH(OH)CH$_2$OH | $C_3H_7$—n | CHO | 7-CH$_2$CH(OH)CH$_2$OH | $CH_3$ | $CH_3$ | H | $CH_2CH_2OH$ |
| 4 | 4-CH$_2$CH$_2$—SO$_3$K | H | CONH$_2$ | 7-CH$_2$CH$_2$—SO$_3$K | $CH_3$ | $CH_3$ | H | $CH_2CH_2$—SO$_3$K |
| 4 | 4-CH$_2$C$_6$H$_5$ | H | CONHCH$_3$ | 7-CH$_2$C$_6$H$_5$ | $CH_3$ | $CH_3$ | H | $C_6H_4$—p-OSO$_3$K |
| 4 | 4-CH$_2$OOCC$_6$H$_5$ | H | OOCC$_6$H$_5$ | 7-CH$_2$OC$_6$H$_5$ | $CH_3$ | $CH_3$ | H | $C_6H_4$—p-OPh |
| 4 | 4-CH$_2$COOCH$_3$ | H | CH$_2$Ph | 7-CH$_2$OOCC$_6$H$_5$ | $CH_3$ | $CH_3$ | H | $CH_2SO_2NHPh$ |
| 5 | 5-CH$_2$COOCH$_3$ | H | CH$_2$SO$_3$K | 7-CH$_2$COOCH$_3$ | H | H | H | $CH_2SO_2NHCH_3$ |
| 4 | 4-C$_6$H$_4$—p-SO$_2$N(C$_2$H$_5$)$_2$ | H | CH$_2$OSO$_3$K | 7-C$_6$H$_4$—p-SO$_2$N(C$_2$H$_5$)$_2$ | $CH_3$ | $CH_3$ | H | $C_6H_4$—p-SO$_2$NHCH$_3$ |
| 4 | 4-CH$_2$CH$_2$NHCOCH$_3$ | H | $C_6H_4$—p-SO$_3$H | 7-CH$_2$CH$_2$NHCOOCH$_3$ | $CH_3$ | $CH_3$ | H | $CH_2COOCH_3$ |
| 3 | 4-CH$_2$NHCONHCH$_3$ | H | CH$_2$CH$_2$OH | 7-CH$_2$NHCONHCH$_3$ | $CH_3$ | $CH_3$ | H | $CH_2SO_2N(CH_3)_2$ |

TABLE 6

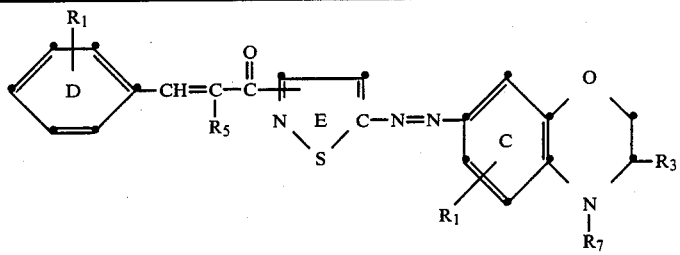

| Cinnamoyl Group Position | $R_1$ on D | $R_5$ | Substituents on E | $R_1$ on C | $R_3$ | $R_7$ |
|---|---|---|---|---|---|---|
| 4 | H | H | H | H | H | H |
| 4 | 4-$NO_2$ | H | $COCH_3$ | 6-$CH_3$ | $CH_3$ | Ph |
| 4 | 4-CN | H | $CH_3$ | 6-$COCH_3$ | $C_2H_5$ | $C_6H_{11}$ |
| 4 | 5-$COCH_3$ | H | Cl | 6-$OCH_3$ | H | $CH_2$—CH=$CH_2$ |
| 4 | 4-COPh | $CH_3$ | CN | 6-$SO_3$Na | H | $CH_2OOCC_2H_5$ |
| 4 | 2,4-di-COOH | $CH_3$ | $CONH_2$ | 6-$OCH_2CH_2SO_4K$ | H | $C_6H_4$—p-$OOCCH_3$ |
| 4 | 4-$OOCCH_3$ | $CH_3$ | $CH_3$ | 6-$OCH_2CH_2SO_4K$ | H | $C_6H_{10}$—4-$CH_3$ |
| 4 | 4-$NHCOCH_3$ | $CH_3$ | $CONHCH_3$ | 6-$CH_3$ | H | $CH_2CH_2(C_4H_4O_2N)$ |
| 3 | 4-NHCOPh | $CH_3$ | $OOCCH_3$ | 6-Ph | $CH_3$ | $CH_2CH_2NO_2$ |
| 3 | 4-$C_2H_5$ | $CH_3$ | $COOCH_3$ | 6-$NO_2$ | $CH_3$ | $C_6H_4$—p-$NO_2$ |
| 4 | 4-Ph | H | $SCH_3$ | 6-$OCH_3$ | $CH_3$ | $CH_2NHOCCH_3$ |
| 4 | 2,5-di-Cl | H | $SCH_2CH=CH_2$ | 6-$NHCOCH_3$ | $C_2H_5$ | $CH_2NHSO_2CH_3$ |
| 4 | 2-Cl—4-$SO_2CH_3$ | H | SPh | 6-$NHSO_2CH_3$ | $CH_3$ | $C_6H_4$—p-$NHOCCH_3$ |
| 4 | 4-$NHSO_2CH_3$ | H | $SC_6H_{11}$ | 6-$COOCH_3$ | $CH_3$ | $C_6H_4$—p-$NHSO_2CH_3$ |
| 4 | 4-$COOCH_3$ | H | OPh | 6-COOH | H | $C_6H_{10}$—4-$NHOCCH_3$ |
| 4 | 2-$OCH_3$ | $C_2H_5$ | $OCH_3$ | 6-Cl | $CH_3$ | $CH_2CH_2Cl$ |
| 4 | 4-$OC_2H_5$ | $C_2H_5$ | Br | 5,6-di-Br | $C_2H_5$ | $C_6H_4$—p-Br |
| 4 | 4-$SO_3$Na | $C_2H_5$ | CN | 5,6-di-Br | H | $C_6H_4$—p-CN |
| 4 | 2-$SO_3$Na | $C_2H_5$ | H | 5-$OCH_3$—6-$NHCOCH_3$ | H | $CH_2CH_2CN$ |
| 4 | 2-$OCH_3$—4-$SO_3K$ | H | H | 6-$CH_2OOCCH_3$ | H | $CH_2CH_2OC_2H_5$ |
| 4 | 4-$OCH_2CH_2OSO_3K$ | H | H | 6-$CH_2Cl$ | H | $CH_2CH_2OCH_2CH_2OC_2H_5$ |
| 4 | 2-$SO_3$Na—5-Cl | H | $COCH_3$ | 6-CN | H | $CH_2$Ph |
| 4 | 4-Cl | H | $CH_3$ | 6-$OOCCH_3$ | $CH_3$ | $CH_2C_6H_{11}$ |
| 4 | 4-OH | H | Cl | 5-COOH | $CH_3$ | $C_6H_4$—o-OH |
| 4 | 4-$CH_2OOCCH_3$ | $C_3H_7$—n | CN | 5-OH | $CH_3$ | $CH_2CH_2OH$ |
| 4 | 4-$SO_3K$ | $C_3H_7$—n | $CONH_2$ | 5-$CH_2CH=CH_2$ | $C_2H_5$ | $CH_2CH_2$—$SO_3K$ |
| 4 | 4-OPh | H | $CH_3$ | 6-$CH_3$ | $CH_3$ | $C_6H_4$—p-$OSO_3K$ |
| 4 | 4-$NO_2$ | H | $CONHCH_3$ | 6-$COCH_3$ | $CH_3$ | $CH_2OPh$ |
| 4 | 5-CN | H | $OOCCH_3$ | 6-$OCH_3$ | H | $CH_2SO_2NHPh$ |
| 4 | 4-$COCH_3$ | H | $COOCH_3$ | 6-$SO_3$Na | $CH_3$ | $CH_2SO_2NHCH_3$ |
| 4 | 5-$CH_3$ | H | $SCH_3$ | 6-$OCH_2CH_2SO_4K$ | H | $C_6H_4$—p-$SO_2NHCH_3$ |
| 4 | 5-Ph | H | $SCH_2CH=CH_2$ | 6-$OCH_2CH_2SO_3K$ | H | $CH_2COOCH_3$ |
| 4 | 5-$OCH_3$ | H | SPh | 6-$CH_3$ | H | $CH_2SO_2N(CH_3)_2$ |
| 4 | 4,5-di-Br | H | $SC_6H_{11}$ | 6-Ph | H | $C_6H_4$—p-$NHCOOCH_3$ |
| 4 | 5-COOH | $C_4H_9$—n | OPh | 6-$NO_2$ | $C_2H_5$ | $CH_2CH_2CONH_2$ |
| 4 | H | H | $OCH_3$ | 6-$OCH_3$ | $C_2H_5$ | $C_6H_4$—p-$CONHCH_3$ |
| 4 | 4-$NO_2$ | H | Br | 6-$NHCOCH_3$ | $CH_3$ | $C_6H_4$—p-$SCH_3$ |
| 4 | 4-CN | H | CN | 6-$NHSO_2CH_3$ | $C_3H_7$—n | $CH_2CH_2SCH_3$ |
| 4 | 5-$COCH_3$ | H | H | 6-$COOCH_3$ | H | CH—$C_6H_4$—p-$SCH_3$ |
| 4 | 4-COPh | $CH_3$ | H | 6-COOH | $CH_3$ | $CH_2SO_2C_2H_5$ |
| 4 | 2,4-di-COH | $CH_3$ | H | 8-Cl | H | $CH_2SO_2Ph$ |
| 4 | 4-$OOCCH_3$ | $CH_3$ | $COCH_3$ | 5,6-di-Br | H | $CH_2CH_2OSO_3K$ |
| 4 | 4-$NHCOCH_3$ | $CH_3$ | $CH_3$ | 5,6-di-Br | H | $C_6H_4$—p-$OSO_3K$ |
| 4 | 4-NHCOPh | $CH_3$ | Cl | 5-$OCH_3$—6-$NHCOCH_3$ | H | $CH_2(C_8H_4O_2N)$ |
| 4 | 4-$CH_2CH=CH_2$ | H | CN | 6-$NHCOCH_3$ | $C_2H_5$ | $C_2H_5$ |
| 4 | H | $CH_3$ | $CONH_2$ | 6-OCPh | $C_2H_5$ | $C_2H_5$ |
| 4 | 4-$CONH_2$ | H | $CH_3$ | 6-$CH_2CONHCH_3$ | H | H |
| 4 | 3-$SO_2NH_2$ | H | $CONHCH_3$ | 6-$CH_2CON(CH_3)_2$ | $CH_3$ | Ph |
| 4 | 4-$SO_2NHCH_3$ | H | $OOCCH_3$ | 6-$CH_2CH_2OCH_2CH_2OC_2H_5$ | $C_2H_5$ | $C_6H_{11}$ |
| 4 | 4-$SO_2N(C_2H_5)_2$ | H | $COOCH_3$ | 6-$CH_2SC_2H_5$ | H | $CH_2$—CH=$CH_2$ |
| 4 | 4-$SO_3C_6H_5$ | $CH_3$ | $SCH_3$ | 6-$CH_2SC_6H_5$ | H | $CH_2OOCC_2H_5$ |
| 4 | 4-$SCH_3$ | $CH_3$ | $SCH_2CH=CH_2$ | 6-$CH_2SO_2C_2H_5$ | H | $C_6H_4$—p-$OOCCH_3$ |
| 4 | 2,4-di-SCN | $CH_3$ | SPh | 6-$CH_2SO_2C_6H_5$ | H | $C_6H_{10}$—p-$CH_3$ |
| 4 | 4-$SO_2C_6H_5$ | $CH_3$ | $SC_6H_{11}$ | 6-$C_6H_3$—o,p-di-CN | H | $CH_2CH_2$—$(C_4H_4O_2N)$ |
| 4 | 2-CHO—4-CN | $CH_3$ | OPh | 6-$C_6H_2$—o,m,p-tri-Cl | $CH_3$ | $CH_2CH_2NO_2$ |
| 4 | 4-$CONHC_2H_5$ | $CH_3$ | $OCH_3$ | 6,8-di-$OSO_3NH(CH_3)_3$ | $CH_3$ | $C_6H_4$—p-$NO_2$ |
| 4 | 4-$CON(C_2H_5)_2$ | H | Br | 5,6-di-$OSO_3$Na | $CH_3$ | $CH_2NHOCCH_3$ |
| 4 | 3-$C_6H_{11}$ | H | CN | 5,6-di-$OSO_3$Na | $C_2H_5$ | $CH_2NHSO_2CH_3$ |
| 4 | 3-$SC_6H_5$ | H | H | 5,6-di-$SO_3NH(CH_3)_3$ | $CH_3$ | $C_6H_4$—p-$NHOCCH_3$ |
| 4 | 4-$NHSO_2C_6H_5$ | H | H | 5,6-di-$OSO_3$Na | $CH_3$ | $C_6H_4$—p-$NHSO_2CH_3$ |
| 4 | 4-$SC_6H_{11}$ | H | H | 6-$SC_6H_{11}$ | H | $C_6H_{10}$—4-$NHOCCH_3$ |
| 4 | 4-$C_6H_4$—p-$CH_3$ | $C_2H_5$ | $COCH_3$ | 6-$C_6H_4$—p-$CH_3$ | $CH_3$ | $CH_2CH_2Cl$ |
| 4 | 4-$C_6H_4$—p-$CH_2CH=CH_2$ | $C_2H_5$ | $CH_3$ | 6-$C_6H_4$—p-$CH_2CH=CH_2$ | $C_2H_5$ | $C_6H_4$—p-Br |
| 4 | 4-$OCH_2CH_2NO_2$ | $C_2H_5$ | Cl | 6-$OCH_2CH_2NO_2$ | H | $C_6H_4$—p-CN |

TABLE 6-continued

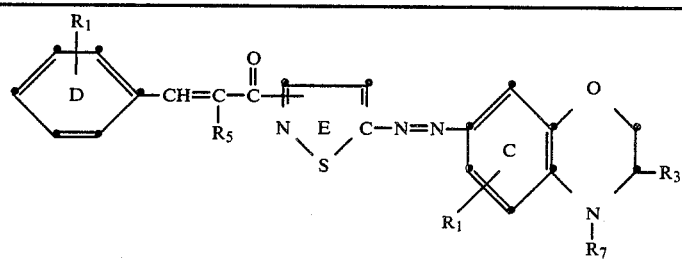

| Cinnamoyl Group Position | R₁ on D | R₅ | Substituents on E | R₁ on C | R₃ | R₇ |
|---|---|---|---|---|---|---|
| 4 | 2-CH₂NHCOCH₃ | C₂H₅ | CN | 6-CH₂NHCOCH₃ | H | CH₂CH₂CN |
| 4 | 4-CH₂NHSO₂C₂H₅ | H | CONH₂ | 6-CH₂NHSO₂C₂H₅ | H | CH₂CH₂OC₂H₅ |
| 4 | 4-CH₂CH₂Cl | H | CH₃ | 6-CH₂CH₂Cl | H | CH₂CH₂OCH₂CH₂OC₂H₅ |
| 4 | 2,6-di-CH₂CN | H | CONHCH₃ | 5,6-di-CH₂CN | H | CH₂Ph |
| 4 | 4-CH₂CH₂OC₂H₅ | H | OOCCH₃ | 6-CH₂CH₂OC₂H₅ | CH₃ | CH₂C₆H₁₁ |
| 4 | 4-CH₂C₆H₅ | H | COOCH₃ | 6-COOH | CH₃ | C₆H₄—o-OH |
| 4 | 4-CH₂C₆H₁₁ | C₃H₇—n | SCH₃ | 6-CH₂C₆H₁₁ | CH₃ | CH₂CH₂OH |
| 4 | 4-CH₂CH(OH)CH₂OH | C₃H₇—n | SCH₂CH=CH₂ | 6-CH₂CH(OH)CH₂OH | C₂H₅ | CH₂CH₂—SO₃K |
| 4 | 4-CH₂CH₂—SO₃K | H | SPh | 6-CH₂CH₂—SO₃K | CH₃ | C₆H₄—p-OSO₃K |
| 4 | 4-CH₂OC₆H₅ | H | SC₆H₁₁ | 6-CH₂OC₆H₅ | CH₃ | CH₂OPh |
| 4 | 4-CH₂OOCC₆H₅ | H | OPh | 6-CH₂OOCC₆H₅ | H | CH₂SO₂NHPh |
| 4 | 5-CH₂COOCH₃ | H | OCH₃ | 5-CH₂COOCH₃ | CH₃ | CH₂SO₂NHCH₃ |
| 4 | 4-C₆H₄—p-SO₂N(C₂H₅)₂ | H | Br | 6-C₆H₄—p-SO₂N(C₂H₅)₂ | H | C₆H₄—p-SO₂NHCH₃ |
| 4 | 4-CH₂CH₂NHCOCH₃ | H | CN | 6-CH₂CH₂NHCOCH₃ | H | CH₂COOCH₃ |
| 4 | 4-CH₂NHCONHCH₃ | H | H | 6-CH₂NHCONHCH₃ | H | CH₂SO₂N(CH₃)₂ |
| 4 | 4-CH₂CONH₂ | H | H | 6-CH₂CONH₂ | H | C₆H₄—p-NHCOOCH₃ |
| 4 | 5-CH₂CONHCH₃ | C₄H₉—n | H | 6-CONH₂ | C₂H₅ | CH₂CH₂CONH₂ |
| 4 | 4-CH₂CON(CH₃)₂ | H | COCH₃ | 6-SO₂NH₂ | C₂H₅ | C₆H₄—p-CONHCH₃ |
| 4 | 4-CH₂CH₂OCH₂CH₂OC₂H₅ | H | CH₃ | 6-SO₂NHCH₃ | CH₃ | C₆H₄—p-SCH₃ |
| 4 | 4-CH₂SC₂H₅ | H | Cl | 6-SO₂N(C₂H₅)₂ | C₃H₇—n | CH₂CH₂SCH₃ |
| 4 | 5-CH₂SC₆H₅ | H | CN | 6-SO₃C₆H₅ | H | CH₂—C₆H₄—p-SCH₃ |
| 4 | 4-CH₂SO₂C₂H₅ | CH₃ | CONH₂ | 6-SCH₃ | CH₃ | CH₂SO₂C₂H₅ |
| 4 | 2,4-di-CH₂SO₂C₆H₅ | CH₃ | CH₃ | 5,6-di-SCN | H | CH₂SO₂Ph |
| 4 | 4-C₆H₃—o,p-di-CN | CH₃ | CONHCH₃ | 6-SO₂C₆H₅ | H | CH₂CH₂OSO₃K |
| 4 | 4-C₆H₂—o,m,p-tri-Cl | CH₃ | OOCCH₃ | 5-CHO—6-CN | H | C₆H₄—p-OSO₃K |
| 4 | 2,6-di-OSO₃Na | CH₃ | COOCH₃ | 6-CONHC₂H₅ | H | CH₂—(C₈H₄O₂N) |
| 3 | H | H | H | 6-CON(C₂H₅)₂ | H | C₂H₅ |
| 3 | H | H | H | 6-C₆H₁₁ | H | C₂H₅ |
| 3 | 5-CH₂(C₈H₄O₂N) | H | H | 6-SC₆H₅ | H | C₂H₅ |
| 4 | 5-CH₂(C₄H₃O) | H | H | 6-NHSO₂C₆H₅ | H | C₂H₅ |

TABLE 7

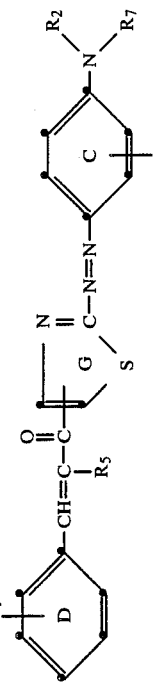

| Cinnamoyl Group Position | R1 on D | R5 | Substituents on G | R1 on C | R2 | R7 |
|---|---|---|---|---|---|---|
| 5 | H | H | H | H | H | H |
| 5 | 4-NO2 | H | COCH3 | 2-CH3 | C2H5 | Ph |
| 5 | 4-CN | H | NO2 | 5-COCH3 | C2H5 | C6H11 |
| 5 | 5-COCH3 | H | Cl | 5-OCH3 | H | CH2—CH=CH2 |
| 5 | 4-COPh | H | CN | 5-SO3Na | H | CH2OOCC2H5 |
| 5 | 2,4-di-COOH | CH3 | NHSO2CH3 | 5-OCH2CH2SO4K | H | C6H4—p-OOCCH3 |
| 5 | 4-OOCCH3 | CH3 | CH3 | 5-OCH2CH2SO4NH(Et)3 | H | C6H10—4-CH3 |
| 4,5 | 4-NHCOCH3 | CH3 | | 2-CH3 | H | CH2CH2(C4H4O2N) |
| 5 | 4-NHCOPh | CH3 | Ph | 2-Ph | CH3 | CH2NO2 |
| 5 | 4-C2H5 | H | H | 2-NO2 | CH3 | C6H4—p-NO2 |
| 5 | 4-Ph | H | CH3 | 2-OCH3 | CH3 | CH2NHOCCH3 |
| 5 | 2-SO3Na | H | CH3 | H | C2H5 | CH2CH2SO3K |
| 5 | H | H | | 5-NHCOCH3 | C2H5 | C2H5 |
| 4,5 | 2,5-di-Cl | H | SO3Na | 3-NHSO2CH3 | C2H5 | CH2NHSO2CH3 |
| 4 | 2-Cl—4-SO2CH3 | H | OCH2CH2SO4K | 3-COOCH3 | C2H5 | C6H4—p-NHOCCH3 |
| 4 | 4-NHSO2CH3 | H | OCH2CH2SO4K | 3-COOH | C2H5 | C6H4—p-NHSO2CH3 |
| 4 | 4-COOCH3 | H | NHCOPh | 2-Cl | C2H5 | C6H10—4-NHCOCH3 |
| 4 | 2-OCH3 | C2H5 | NHCOCH3 | 2,6-di-Br | CH2CH2Cl | CH2CH2Cl |
| 5 | 4-OC2H5 | C2H5 | NHCOCH3 | 2,6-di-Br | C6H4—p-Br | C6H4—p-Br |
| 5 | 4-SO3Na | C2H5 | OOCC2H5 | 2-OCH3—5-NHCOCH3 | C6H4—p-CN | C6H4—p-CN |
| 5 | 2-SO3Na | C2H5 | COOH | 2-CH2OOCCH3 | CH2CH2CN | CH2CH2CN |
| 5 | 2-OCH3—4-SO3K | H | H | 2-CCl2Cl | CH2CH2OC2H5 | CH2CH2OC2H5 |
| 4 | 4-OCH2CH2OSO3K | H | H | 2-CN | CH2CH2OCH2CH2OC2H5 | CH2CH2OCH2CH2OC2H5 |
| 5 | 2-SO3Na—5-Cl | H | SO2CH3 | 2-OOCCH3 | CH2Ph | CH2Ph |
| 5 | 4-Cl | H | CF3 | 5-COOH | H | C6H4—o-OH |
| 5 | 4-OH | C3H7—n | COOCH3 | 5-OH | C2H5 | CH2CH2OH |
| 5 | 4-CH2OOCCH3 | C3H7—n | CHO | 5-CH2CH=CH2 | CH2CH2SO3K | CH2CH2—SO3K |
| 5 | 4-SO3K | H | CONH2 | 5-CH3 | H | C6H4—p-OSO3K |
| 5 | 4-OPh | H | CONCH3 | 5-COCH3 | H | CH2OPh |
| 5 | 4-NO2 | H | CH2Ph | 5-OCH3 | CH2SO2NHCH3 | CH2SO2NHPh |
| 5 | 5-CN | H | CH2SO3K | 5-SO3Na | H | CH2SO2NHCH3 |
| 5 | 4-COCH3 | H | CH2OSO3K | 5-OCH2CH2SO4K | H | C6H4—p-SO2NHCH3 |
| 5 | 5-CH3 | H | C6H4—p-SO3K | 5-OCH2CH2SO3K | H | C6H4—p-COOCH3 |
| 5 | 5-Ph | C4H9—n | CH3CH2OH | 2-CH3 | H | CH2COOCH3 |
| 5 | 5-OCH3 | H | CH2Cl | 2-Ph | C2H5 | CH3SO2N(CH3)2 |
| 5 | 4,5-di-Br | H | C6H4—p-Br | 2-NO2 | C2H5 | C6H4—p-NHCOOCH3 |
| 5 | 5-COOH | H | H | 2-OCH3 | C2H5 | CH2CH2CONH2 |
| 5 | H | H | COCH3 | 5-NHCOCH3 | C2H5 | C6H4—p-CONHCH3 |
| 5 | 4-NO2 | H | NO2 | 3-NHSO2CH3 | CH2CH2SCH3 | C6H4—p-SCH3 |
| 5 | 4-CN | H | Cl | 3-COOH | H | CH2—C6H4—p-SCH3 |
| 5 | 5-COCH3 | CH3 | CN | 3-COOH | CH2SO2C2H5 | CH2SO2C2H5 |

TABLE 7-continued

| Cinnamoyl Group Position | $R_1$ on D | $R_5$ | Substituents on G | $R_1$ on C | $R_2$ | $R_7$ |
|---|---|---|---|---|---|---|
| 5 | 2,4-di-COOH | $CH_3$ | $NHSO_2CH_3$ | 2-Cl | H | $CH_2SO_2Ph$ |
| 5 | 4-OOCCH_3 | $CH_3$ | $CH_3$ | 2,6-di-Br | H | $CH_2CH_2OSO_3K$ |
| 5 | 4-NHCOCH_3 | $CH_3$ | $OCH_3$ | 2,6-di-Br | H | $C_6H_4$—p-$OSO_3K$ |
| 5 | 4-NHCOPh | $CH_3$ | Ph | 2-$OCH_3$—5-$NHCOCH_3$ | H | $CH_2(C_8H_4O_2N)$ |
| 5 | 4-$CH_2CH=CH_2$ | H | H | 3-$NHCOCH_3$ | $C_2H_5$ | $C_2H_5$ |
| 4 | H | H | H | 3-OCPh | $C_2H_5$ | $C_2H_5$ |
| 4 | 4-$CONH_2$ | H | $COCH_3$ | 5-$CH_2CONHCH_3$ | H | H |
| 4 | 3-$SO_2NH_2$ | H | $NO_2$ | 5-$CH_2CON(CH_3)_2$ | $C_2H_5$ | $C_6H_{11}$ |
| 4 | 4-$SO_2NHCH_3$ | H | Cl | 5-$CH_2CH_2OCH_2CH_2OC_2H_5$ | $C_2H_4$ | $CH_2$—CH=$CH_2$ |
| 4 | 4-$SO_2N(C_2H_5)_2$ | $CH_3$ | CN | 5-$CH_2SC_2H_5$ | H | $CH_2OOCC_2H_5$ |
| 4 | 4-$SO_3C_6H_5$ | $CH_3$ | $NHSO_2CH_3$ | 2-$CH_2SC_6H_5$ | H | $C_6H_4$—p-$OOCCH_3$ |
| 5 | 4-SCH_3 | $CH_3$ | $CH_3$ | 5-$CH_2SO_2C_2H_5$ | H | $C_6H_{10}$—4-$CH_3$ |
| 5 | 2,4-di-SCN | $CH_3$ | $OCH_3$ | 5-$CH_2SO_2C_6H_5$ | H | $CH_2CH_2(C_4H_4O_2N)$ |
| 5 | 4-$SO_2C_6H_5$ | $CH_3$ | Ph | 5-$C_6H_3$—o,p-di-CN | $CH_3$ | $CH_2CH_2NO_2$ |
| 5 | 2-CHO—4-CN | $CH_3$ | H | 5-$C_6H_2$—o,m,p-tri-Cl | $CH_3$ | $C_6H_4$—p-$NO_2$ |
| 5 | 4-$CON(C_2H_5)_2$ | H | H | 2,6-di-$OSO_3NH(CH_3)_2$ | $CH_3$ | $CH_2NHOCCH_3$ |
| 5 | 3-$C_6H_{11}$ | H | $SO_3Na$ | 2,6-di-$SO_3NH(CH_3)_3$ | $CH_3$ | $CH_2NHSO_2CH_3$ |
| 3 | 3-$SC_6H_5$ | H | $SO_3Na$ | 2-$SO_3NH(CH_3)$ | $C_2H_5$ | $C_6H_4$—p-$NHOCCH_3$ |
| 5 | 4-$NHSO_2C_6H_5$ | H | $OCH_2CH_2SO_4K$ | 2-$OSO_3NH(CH_3)_3$ | $C_2H_5$ | $C_6H_4$—p-$NHSO_2CH_3$ |
| 5 | 4-$SC_6H_{11}$ | H | $OCH_2CH_2SO_4K$ | 5-$SC_6H_{11}$ | $C_2H_5$ | $C_6H_{10}$—4-$NHOCCH_3$ |
| 5 | 4-$C_6H_4$—p-$CH_3$ | $C_2H_5$ | $NHCOPh$ | 5-$C_6H_4$—p-$CH_3$ | $CH_2CH_2Cl$ | $CH_2CH_2Cl$ |
| 5 | 4-$C_6H_4$—p-$CH_2CH=CH_2$ | $C_2H_5$ | $NHCOPh$ | 5-$C_6H_4$—p-$CH_2CH=CH_2$ | $C_6H_5$ | $C_6H_4$—p-Br |
| 5 | 4-$CH_2CH(OH)CH_2OH$ | $C_2H_5$ | $NHCOCH_3$ | 5-$OCH_2CH_2NO_2$ | $C_6H_4$—p-CN | $C_6H_4$—p-CN |
| 5 | 2-$CH_2NHSO_2CH_3$ | H | $OOCC_6H_5$ | 2-$CH_2NHCOCH_3$ | $CH_2CH_2CN$ | $CH_2CH_2CN$ |
| 5 | 4-$CH_2NHSO_2C_2H_5$ | H | $COOH$ | 5-$CH_2NHSO_2C_2H_5$ | $CH_2CH_2OC_2H_5$ | $CH_2CH_2OC_2H_5$ |
| 5 | 4-$OCH_2CH_3$ | H | H | 5-$CH_2CH_2Cl$ | $CH_2CH_2OCH_2CH_2OC_2H_5$ | $CH_2CH_2OCH_2CH_2OC_2H_5$ |
| 5 | 2,6-di-$CH_2Cl$ | H | H | 2,6-di-$CH_2CN$ | $CH_2Ph$ | $CH_2Ph$ |
| 5 | 4-$CH_2C_6H_5$ | H | $SO_2CH_3$ | 5-$COOH$ | $CH_2C_6H_{11}$ | $C_6H_4$—o-OH |
| 3 | 4-$CH_2C_6H_{11}$ | $C_3H_7$—n | $CH_2C_6H_5$ | 5-$CH_2C_6H_{11}$ | H | $CH_2CH_2OH$ |
| 5 | 4-$CH_2CH(OH)CH_2OH$ | $C_3H_7$—n | $COOCH_3$ | 5-$CH_2CH(OH)CH_2OH$ | $C_2H_5$ | $CH_2CH_2$—$SO_3K$ |
| 5 | 4-$CH_2CH_2$—$SO_3K$ | H | $CHO$ | 5-$CH_2CH_2$—$SO_3K$ | $CH_2CH_2$—$SO_3K$ | $C_6H_4$—p-$OSO_3K$ |
| 5 | 4-$CH_2OC_6H_5$ | H | $CONH_2$ | 5-$CH_2OC_6H_5$ | H | $CH_2OPh$ |
| 4 | 4-$OOCC_6H_5$ | H | $CONHCH_3$ | 5-$OOCC_6H_5$ | H | $CH_2SO_2NHPh$ |
| 5 | 5-$CH_2COOCH_3$ | H | $CH_2Ph$ | 5-$COOCH_3$ | H | $CH_2SO_2NHCH_3$ |
| 5 | 4-$C_6H_4$—p-$SO_2N(C_2H_5)_2$ | H | $CH_2OSO_3K$ | 5-$C_6H_4$—p-$SO_2N(C_2H_5)_2$ | $CH_2SO_2NHCH_3$ | $C_6H_4$—p-$SO_2NHCH_3$ |
| 5 | 4-$CH_2CH_2NHCOOCH_3$ | H | $CH_2OSO_3K$ | 5-$CH_2NHCOOCH_3$ | H | $CH_2COOCH_3$ |
| 5 | 4-$CH_2NHCONHCH_3$ | H | $C_6H_4$—p-$SO_3K$ | 5-$CH_2NHCONHCH_3$ | $CH_2COOCH_3$ | $CH_2COOCH_3$ |
| 4 | 4-$CH_2CONH_2$ | $C_4H_9$—n | $CH_2CH_2OH$ | 5-$CONH_2$ | H | $C_6H_4$—p-$NHCOOCH_3$ |
| 5 | 5-$CH_2CONHCH_3$ | H | $CH_2Cl$ | 5-$CONH_2$ | $C_2H_5$ | $CH_2CH_2CONH_2$ |
| 5 | 4-$CH_2CON(CH_3)_2$ | H | $C_6H_4$—p-Br | 3-$SO_2NH_2$ | $C_2H_5$ | $C_6H_4$—p-$CONHCH_3$ |

TABLE 7-continued

Structure: D ring with R₁ substituent, CH=C(R₅)-C(=O)-G-S-C(=N-N=)-C ring with R₁, N(R₂)(R₇)

| Cinnamoyl Group Position | R₁ on D | R₅ | Substituents on G | R₁ on C | R₂ | R₇ |
|---|---|---|---|---|---|---|
| 5 | 4-CH₂CH₂OCH₂CH₂OC₂H₅ | H | COCH₃ | 5-SO₂NHCH₃ | C₆H₅ | C₆H₄—p-SCH₃ |
| 5 | 4-CH₂SC₂H₅ | H | NO₂ | 5-SO₂N(C₂H₅)₂ | CH₂CH₂SCH₃ | CH₂CH₂SCH₃ |
| 5 | 5-CH₂SC₆H₅ | H | Cl | 5-SO₃C₆H₅ | H | CH₂—C₆H₄—p-SCH₃ |
| 5 | 4-CH₂SO₂C₂H₅ | CH₃ | CN | 5-SCH₃ | CH₂SO₂C₂H₅ | CH₂SO₂C₂H₅ |
| 5 | 2,4-di-CH₂SO₂C₆H₅ | CH₃ | NHSO₂CH₃ | 2,5-di-SCN | H | CH₂SO₂Ph |
| 5 | 4-C₆H₃—o,p-di-CN | CH₃ | CH₃ | 5-SO₂C₆H₅ | H | CH₂OSO₃K |
| 5 | 4-C₆H₂—o,m,p-tri-Cl | CH₃ | OCH₃ | 2-CHO—6-CN | H | C₆H₄—p-OSO₃K |
| 5 | 2,6-di-OSO₃Na | CH₃ | Ph | 5-CONHC₂H₅ | H | CH₂—(C₈H₄O₂N) |
| 5 | H | H | CH₂(C₄H₄O₂N) | 5-CON(C₂H₅)₂ | C₂H₅ | C₂H₅ |
| 5 | H | H | CH₂(C₄H₃O) | 3-C₆H₁₁ | C₂H₅ | C₂H₅ |
| 5 | 5-CH₂(C₈H₄O₂N) | H | H | 3-SC₆H₅ | C₂H₅ | C₂H₅ |
| 5 | 5-CH₂(C₄H₃O) | H | H | 6-NHSO₂C₆H₅ | C₂H₅ | C₂H₅ |

TABLE 8

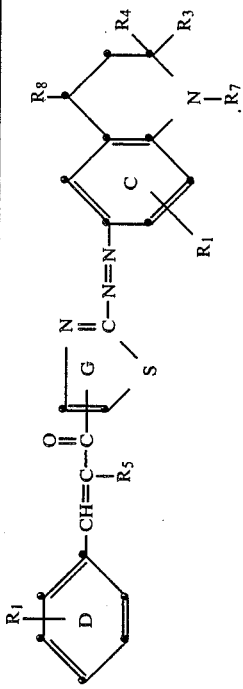

| Cinnamoyl Group Position | $R_1$ on D | $R_5$ | Substituents on G | $R_1$ on C | $R_3$ | $R_4$ | $R_8$ | $R_7$ |
|---|---|---|---|---|---|---|---|---|
| 5 | H | H | H | H | H | H | H | H |
| 5 | 4-NO$_2$ | H | COCH$_3$ | 7-CH$_3$ | CH$_3$ | CH$_3$ | CH$_3$ | Ph |
| 5 | 4-CN | H | SCN | 5-COCH$_3$ | CH$_3$ | CH$_3$ | H | C$_6$H$_{11}$ |
| 5 | 5-COCH$_3$ | CH$_3$ | Cl | 5-OCH$_3$ | CH$_3$ | CH$_3$ | H | CH$_2$—CH=CH$_2$ |
| 5 | 4-COPh | CH$_3$ | CN | 7-SO$_3$Na | CH$_3$ | CH$_3$ | H | CH$_2$OOCC$_2$H$_5$ |
| 5 | 2,4-di-COOH | CH$_3$ | H | 7-OCH$_2$CH$_2$SO$_4$K | CH$_3$ | CH$_3$ | H | C$_6$H$_4$—p-OOCCH$_3$ |
| 5 | 4-OOCCH$_3$ | CH$_3$ | CH$_3$ | 7-OCH$_2$CH$_2$SO$_4$NH(Et)$_3$ | CH$_3$ | CH$_3$ | H | C$_6$H$_{10}$—4-CH$_3$ |
| 5 | 4-NHCOCH$_3$ | CH$_3$ | SCH$_3$ | 7-CH$_3$ | CH$_3$ | H | H | CH$_2$CH$_2$(C$_4$H$_4$O$_2$N) |
| 5 | 4-NHCOPh | CH$_3$ | Ph | 7-Ph | CH$_3$ | CH$_3$ | H | CH$_2$CH$_2$-NO$_2$ |
| 5 | 4-C$_2$H$_5$ | CH$_3$ | H | 7-NO$_2$ | CH$_3$ | CH$_3$ | H | C$_6$H$_4$-p-NO$_2$ |
| 5 | 4-Ph | CH$_3$ | H | 7-OCH$_3$ | CH$_3$ | CH$_3$ | H | CH$_2$NHOCCH$_3$ |
| 4 | 2,5-di-Cl | H | SO$_2$Ph | 7-NHCOCH$_3$ | CH$_3$ | CH$_3$ | H | CH$_2$NHSO$_2$CH$_3$ |
| 4 | 2-Cl—4-SO$_2$CH$_3$ | H | COPh | 7-NHSO$_2$CH$_3$ | CH$_3$ | CH$_3$ | H | C$_6$H$_4$—p-NHOCCH$_3$ |
| 4 | 4-NHSO$_2$CH$_3$ | H | H | 7-COOCH$_3$ | CH$_3$ | CH$_3$ | H | C$_6$H$_4$—p-NHSO$_2$CH$_3$ |
| 4 | 4-COOCH$_3$ | H | H | 7-COOH | CH$_3$ | C$_2$H$_5$ | H | C$_6$H$_{10}$—4-NHOCCH$_3$ |
| 4 | 2-OCH$_3$ | C$_2$H$_5$ | CON(C$_2$H$_5$)$_2$ | 7-Cl | H | H | C$_2$H$_5$ | CH$_2$CH$_2$Cl |
| 4 | 4-OC$_2$H$_5$ | C$_2$H$_5$ | H | 5,7-di-Br | CH$_3$ | CH$_3$ | CH$_3$ | C$_6$H$_4$—p-Br |
| 4 | 4-SO$_3$Na | C$_2$H$_5$ | OOCC$_2$H$_5$ | 5,7-di-Br | CH$_3$ | CH$_3$ | H | C$_6$H$_4$—p-CN |
| 4 | 2-SO$_3$Na | C$_2$H$_5$ | H | 5-OCH$_3$—7-NHCOCH$_3$ | CH$_3$ | CH$_3$ | H | CH$_2$CH$_2$CN |
| 5 | 2-OCH$_3$—4-SO$_3$K | H | C$_3$H$_7$—n | 7-CH$_2$OOCCH$_3$ | CH$_3$ | CH$_3$ | H | CH$_2$CH$_2$OC$_2$H$_5$ |
| 4 | 4-OCH$_2$CH$_2$OSO$_3$K | H | C$_2$H$_7$ | 7-CH$_2$Cl | CH$_3$ | CH$_3$ | H | CH$_2$CH$_2$OCH$_2$CH$_2$OC$_2$H$_5$ |
| 5 | 2-SO$_3$Na—5-Cl | H | Br | 7-CN | CH$_3$ | CH$_3$ | H | CH$_2$Ph |
| 4 | 4-Cl | H | SO$_2$CH$_3$ | 7-OOCCH$_3$ | CH$_3$ | CH$_3$ | H | CH$_2$C$_6$H$_5$ |
| 5 | 4-OH | H | Cl | 5-COOH | CH$_3$ | CH$_3$ | H | C$_6$H$_4$-o-OH |
| 4 | 4-CH$_2$OOCCH$_3$ | H | COOCH$_3$ | 5-OH | CH$_3$ | CH$_3$ | H | CH$_2$CH$_2$OH |
| 4 | 4-SO$_3$K | C$_3$H$_7$—n | CHO | 5-CH$_2$CH=CH$_2$ | CH$_3$ | CH$_3$ | H | CH$_2$CH$_2$—SO$_3$K |
| 4 | 4-OPh | C$_3$H$_7$—n | CONH$_2$ | 7-CH$_3$ | CH$_3$ | CH$_3$ | H | C$_6$H$_4$—p-OSO$_3$K |
| 4 | 4-NO$_2$ | H | CONHCH$_3$ | 7-COCH$_3$ | CH$_3$ | CH$_3$ | H | CH$_2$OPh |
| 5 | 5-CN | H | Ph | 7-OCH$_3$ | CH$_3$ | CH$_3$ | H | CH$_2$SO$_2$NHPh |
| 5 | 4-COCH$_3$ | H | SCN | 7-SO$_3$Na | H | H | C$_2$H$_5$ | CH$_2$SO$_2$NHCH$_3$ |
| 5 | 5-CH$_3$ | H | CN | 7-OCH$_2$CH$_2$SO$_3$K | CH$_3$ | CH$_3$ | CH$_3$ | C$_6$H$_4$—p-SO$_2$NHCH$_3$ |
| 5 | 5-Ph | H | SO$_2$Ph | 7-OCH$_2$CH$_2$SO$_3$K | CH$_3$ | CH$_3$ | H | CH$_2$COOCH$_3$ |
| 5 | 4,5-di-Br | C$_4$H$_9$—n | Br | 7-CH$_3$ | CH$_3$ | CH$_3$ | H | C$_6$H$_4$—p-NHCOOCH$_3$ |
| 5 | 5-COOH | H | H | 7-Ph | CH$_3$ | CH$_3$ | H | CH$_2$COOCH$_3$ |
| 5 | H | H | H | 7-NO$_2$ | H | H | H | C$_6$H$_4$—p-CONH$_2$ |
| 5 | 4-NO$_2$ | H | COCH$_3$ | 7-OCH$_3$ | CH$_3$ | CH$_3$ | H | C$_6$H$_4$—p-CONHCH$_3$ |
| 5 | 4-CN | H | C$_4$H$_9$—n | 7-NHCOCH$_3$ | CH$_3$ | CH$_3$ | H | C$_6$H$_4$—p-SCH$_3$ |
| 5 | 5-COCH$_3$ | H | Cl | 7-NHSO$_2$CH$_3$ | CH$_3$ | CH$_3$ | H | CH$_2$CH$_2$SCH$_3$ |
| 5 | 5-COOH | CH$_3$ | CH | 7-COOCH$_3$ | CH$_3$ | CH$_3$ | H | CH$_2$—C$_6$H$_4$—p-SCH$_3$ |
| 5 | 4-COPh | CH$_3$ | CH$_3$ | 7-COOH | CH$_3$ | CH$_3$ | H | CH$_2$SO$_2$C$_2$H$_5$ |

TABLE 8-continued

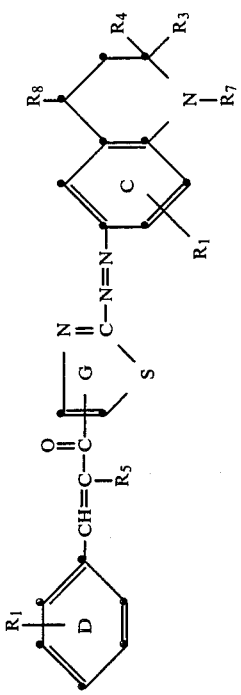

| Cinnamoyl Group Position | $R_1$ on D | $R_5$ | Substituents on G | $R_1$ on C | $R_3$ | $R_4$ | $R_8$ | $R_7$ |
|---|---|---|---|---|---|---|---|---|
| 5 | 2,4-di-COOH | $CH_3$ | $SO_2CH_3$ | 7-Cl | $CH_3$ | $CH_3$ | H | $CH_2SO_2Ph$ |
| 5 | 4-OOCCH_3 | $CH_3$ | $CH_3$ | 5,7-di-Br | $CH_3$ | H | H | $CH_2CH_2OSO_3K$ |
| 5 | 4-NHCOCH_3 | $CH_3$ | CN | 5,7-di-Br | $CH_3$ | H | H | $C_6H_4$—p-$OSO_3K$ |
| 5 | 4-NHCOPh | $CH_3$ | H | 5-OCH_3—7-NHCOCH_3 | $CH_3$ | H | H | $CH_2(C_8H_4O_2N)$ |
| 5 | 4-CH_2CH=CH_2 | $C_2H_5$ | H | 7-NHCOCH_3 | $C_2H_5$ | H | H | $C_2H_5$ |
| 5 | H | $CH_3$ | $CH_3$ | 7-OCPh | $C_2H_5$ | H | H | $C_2H_5$ |
| 5 | 4-CONH_2 | H | H | 7-CH_2CONHCH_3 | H | H | H | H |
| 5 | 3-SO_2NH_2 | H | $COCH_3$ | 7-CH_3CON(CH_3)_2 | $CH_3$ | $CH_3$ | $CH_3$ | Ph |
| 5 | 4-SO_2NHCH_3 | H | H | 7-CH_2CH_2OCH_2CH_2OC_2H_5 | $CH_3$ | $CH_3$ | H | $C_6H_{11}$ |
| 5 | 4-SO_2N(C_2H_5)_2 | H | Cl | 7-CH_2SC_2H_5 | $CH_3$ | $CH_3$ | H | $CH=-CH=CH_2$ |
| 5 | 4-SO_3C_6H_5 | $CH_3$ | CN | 7-CH_2SC_6H_5 | $CH_3$ | $CH_3$ | H | $CH_2OOCC_2H_5$ |
| 5 | 4-SCH_3 | $CH_3$ | $SO_2CH_3$ | 7-CH_2SO_2C_2H_5 | $CH_3$ | $CH_3$ | H | $C_6H_4$—p-$OOCCH_3$ |
| 5 | 2,4-di-SCN | $CH_3$ | $CH_3$ | 7-CH_2SO_2C_6H_5 | $CH_3$ | $CH_3$ | H | $C_6H_{10}$—4-$CH_3$ |
| 5 | 4-SO_2C_6H_5 | $CH_3$ | H | 7-C_6H_3—9,p-di-CN | $CH_3$ | $CH_3$ | H | $CH_2CH_2$—($C_4H_2O_2N$) |
| 5 | 2-CHO—4-CN | $CH_3$ | Ph | 7-C_6H_2—o,m,p-tri-Cl | $CH_3$ | $CH_3$ | H | $C_6H_4$—p-$NO_2$ |
| 5 | 4-CONHC_2H_5 | H | H | 5,7-di-OSO_3NH(CH_3)_3 | $CH_3$ | $CH_3$ | H | $CH_2NHOCCH_3$ |
| 5 | 4-CON(C_2H_5)_2 | H | H | 5,7-di-OSO_3Na | $CH_3$ | $CH_3$ | H | $CH_2NHSO_2CH_3$ |
| 5 | 3-C_6H_{11} | H | CN | 5,7-di-SO_3NH(CH_3)_3 | $CH_3$ | $CH_3$ | H | $C_6H_4$—p-$NHOCH_3$ |
| 5 | 3-SC_6H_5 | H | $C_2H_5$ | 5,7-di-OSO_3NH(CH_3)_3 | $CH_3$ | $CH_3$ | H | $C_6H_4$—p-$NHSO_2CH_3$ |
| 5 | 4-NHSO_2C_6H_5 | H | H | 5,7-di-OSO_3Na | $CH_3$ | $C_2H_5$ | $C_2H_5$ | $C_6H_{10}$—4-$NHOCCH_3$ |
| 5 | 4-SC_6H_{11} | H | H | 7-SC_6H_{11} | H | $CH_3$ | H | $CH_2CH_2Cl$ |
| 5 | 4-C_6H_4—p-CH_3 | $C_2H_5$ | $CH_3$ | 7-C_6H_4—p-$CH_3$ | $CH_3$ | $CH_3$ | H | $C_6H_4$—p-Br |
| 5 | 4-C_6H_4—p-CH_2CH=CH_2 | $C_2H_5$ | Cl | 7-C_6H_4—p-$CH_2CH=CH_2$ | $CH_3$ | $CH_3$ | H | $C_6H_4$—p-CN |
| 5 | 4-OCH_2CH_2NO_2 | $C_2H_5$ | H | 7-OCH_2CH_2NO_2 | $CH_3$ | $CH_3$ | H | $CH_2CN$ |
| 5 | 2-CH_2NHCOCH_3 | $C_2H_5$ | $OOCC_2H_5$ | 7-CH_2NHSO_2C_2H_5 | $CH_3$ | $CH_3$ | H | $CH_2OC_2H_5$ |
| 5 | 4-CH_2NHSO_2C_2H_5 | H | $CH_3$ | 7-CH_2CH_2Cl | $CH_3$ | $CH_3$ | H | $CH_2CH_2OC_2H_5$ |
| 5 | 4-CH_2CH_2Cl | H | H | 5,7-di-CH_2CN | $CH_3$ | $CH_3$ | H | $CH_2CH_2OCH_2CH_2OC_2H_5$ |
| 5 | 2,6-di-CH_2CN | H | $SO_2CH_3$ | 7-COOH | $CH_3$ | $CH_3$ | H | $CH_2Ph$ |
| 5 | 4-CH_2CH_2OC_2H_5 | H | Ph | 7-COOH | $CH_3$ | $CH_3$ | H | $CH_2C_6H_{11}$ |
| 5 | 4-CH_2C_6H_5 | H | $COOCH_3$ | 7-CH_2C_6H_{11} | $CH_3$ | $CH_3$ | H | $C_6H_4$—o-OH |
| 5 | 4-CH_2C_6H_{11} | $C_3H_7$—n | CHO | 7-CH_2CH(OH)CH_2OH | $CH_3$ | $CH_3$ | H | $CH_2CH_2OH$ |
| 5 | 4-CH_2CH(OH)CH_2OH | $C_3H_7$—n | $CONH_2$ | 7-CH_2CH_2—$SO_3K$ | $CH_3$ | $CH_3$ | H | $CH_2CH_2$—$SO_3K$ |
| 5 | 4-CH_2CH_2—SO_3K | H | $CONHCH_3$ | 7-CH_2OC_6H_5 | $CH_3$ | $CH_3$ | H | $C_6H_4$—p-$OSO_3K$ |
| 5 | 4-CH_2OC_6H_5 | H | $CONHC_2H_5$ | 7-CH_2OOCC_6H_5 | $CH_3$ | $CH_3$ | H | $CH_2OPh$ |
| 5 | 4-CH_2OOCC_6H_5 | H | $SO_2C_2H_5$ | 7-CH_2COOCH_3 | $CH_3$ | $CH_3$ | H | $CH_2SO_2NHPh$ |
| 5 | 5-CH_2COOCH_3 | H | $SO_2CH_3$ | 5,7-di-CH_2CN | $C_2H_5$ | $C_2H_5$ | $C_2H_5$ | $CH_2SO_2NHCH_3$ |
| 5 | 4-C_6H_4—p-SO_2N(C_2H_5)_2 | H | H | 7-C_6H_4—p-$SO_2N(C_2H_5)_2$ | $CH_3$ | H | $CH_3$ | $C_6H_4$—p-$SO_2NHCH_3$ |
| 5 | 4-CH_2CH_2NHCOCH_3 | H | H | 7-CH_2CH_2NHCOOCH_3 | $CH_3$ | $CH_3$ | H | $CH_2COOCH_3$ |
| 5 | 4-CH_2NHCONHCH_3 | H | H | 7-CH_2NHCONHCH_3 | $CH_3$ | $CH_3$ | H | $CH_2SO_2N(CH_3)_2$ |
| 5 | 4-CH_2CONH_2 | H | $SC_2H_5$ | 7-CH_2CONH_2 | $CH_3$ | $CH_3$ | H | $C_6H_4$—p-$NHCOOCH_3$ |

TABLE 8-continued

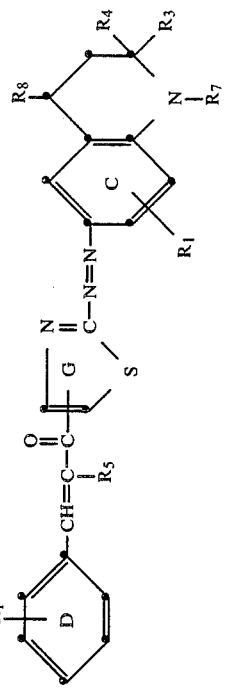

| Cinnamoyl Group Position | R₁ on D | R₅ | Substituents on G | R₁ on C | R₃ | R₄ | R₈ | R₇ |
|---|---|---|---|---|---|---|---|---|
| 5 | 5-CH₂CONHCH₃ | C₄H₉—n | COC₆H₅ | 7-CONH₂ | H | H | H | CH₂CH₂CONH₂ |
| 5 | 4-CH₂CON(CH₃)₂ | H | H | 7-SO₂NH₂ | CH₃ | CH₃ | CH₃ | C₆H₄—p-CONHCH₃ |
| 5 | 4-CH₂CH₂OCH₂CH₂OC₂H₅ | H | COCH₃ | 7-SO₂NHCH₃ | CH₃ | CH₃ | H | C₆H₄—p-SCH₃ |
| 5 | 4-CH₂SC₂H₅ | CH₃ | SCN | 7-SO₂N(C₂H₅)₂ | CH₃ | CH₃ | H | CH₂CH₂SCH₃ |
| 5 | 5-CH₂SC₆H₅ | H | Cl | 7-SO₃C₆H₅ | CH₃ | CH₃ | H | CH₂—C₆H₄—p-SCH₃ |
| 5 | 4-CH₂SO₂C₂H₅ | CH₃ | CN | 7-SCH₃ | CH₃ | CH₃ | H | CH₂SO₂C₂H₅ |
| 5 | 2,4-di-CH₂SO₂C₆H₅ | CH₃ | Cl | 5,7-di-SCN | CH₃ | CH₃ | H | CH₂SO₂Ph |
| 5 | 4-C₆H₃—o,p-di-CN | CH₃ | CH₃ | 7-SO₂C₆H₅ | CH₃ | H | H | CH₂CH₂OSO₃K |
| 5 | 4-C₆H₂—o,m,p-tri-Cl | CH₃ | CONH₂ | 5-CHO—7-CN | CH₃ | H | H | C₆H₄—p-OSO₃K |
| 5 | 2,6-di-OSO₃Na | CH₃ | Ph | 7-CONHC₂H₅ | CH₃ | H | H | CH₂(C₈H₄O₂N) |
| 5 | H | H | H | 7-CON(C₂H₅)₂ | CH₃ | H | H | C₂H |
| 5 | 5-CH₂(C₈H₄O₂N) | H | SO₂C₆H₅ | 7-C₆H₁₁ | CH₃ | H | H | C₂H₅ |
| 5 | 5-CH₂(C₈H₄O₂N) | H | CHO | 7-SC₆H₅ | CH₃ | H | H | C₂H₅ |
| 5 | 5-CH₂(C₄H₃O) | H | Br | 7-NHSO₂C₆H₅ | CH₃ | C₂H₅ | C₂H₅ | C₂H₅ |

TABLE 9

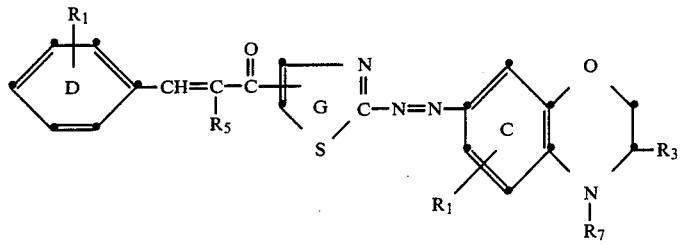

| Cinnamoyl Group Position | $R_1$ on D | $R_5$ | Substituents on G | $R_1$ on C | $R_3$ | $R_7$ |
|---|---|---|---|---|---|---|
| 5 | H | H | H | H | H | H |
| 5 | 4-$NO_2$ | H | $COCH_3$ | 6-$CH_3$ | $C_2H_5$ | Ph |
| 5 | 4-CN | H | $NO_2$ | 6-$COCH_3$ | $C_2H_5$ | $C_6H_{11}$ |
| 5 | 5-$COCH_3$ | H | Cl | 6-$OCH_3$ | H | $CH_2$—CH=$CH_2$ |
| 5 | 4-COPh | H | CN | 6-$SO_3Na$ | H | $CH_2OOCC_2H_5$ |
| 5 | 2,4-di-COOH | $CH_3$ | $NHSO_2CH_3$ | 6-$OCH_2CH_2SO_4K$ | H | $C_6H_4$—p-$OOCCH_3$ |
| 5 | 4-$OOCCH_3$ | $CH_3$ | $CH_3$ | 6-$OCH_2CH_2SO_4K$ | H | $C_6H_{10}$—4-$CH_3$ |
| 5 | 4-$NHCOCH_3$ | $CH_3$ | $OCH_3$ | 6-$CH_3$ | H | $CH_2CH_2(C_4H_4O_2N)$ |
| 5 | 4-NHCOPh | $CH_3$ | Ph | 6-Ph | $CH_3$ | $CH_2CH_2NO_2$ |
| 5 | 4-$C_2H_5$ | $CH_3$ | H | 6-$NO_2$ | $CH_3$ | $C_6H_4$—p-$NO_2$ |
| 5 | 4-Ph | H | H | 6-$OCH_3$ | $CH_3$ | $CH_2NHOCCH_3$ |
| 4 | 2,5-di-Cl | H | $SO_3Na$ | 6-$NHCOCH_3$ | $C_2H_5$ | $CH_2NHSO_2CH_3$ |
| 4 | 2-Cl—4-$SO_2CH_3$ | H | $SO_3Na$ | 6-$NHSO_2CH_3$ | $CH_3$ | $C_6H_4$—p-$NHOCCH_3$ |
| 4 | 4-$NHSO_2CH_3$ | H | $OCH_2CH_2SO_4K$ | 6-$COOCH_3$ | $CH_3$ | $C_6H_4$—p-$NHSO_2CH_3$ |
| 4 | 4-$COOCH_3$ | H | $OCH_2CH_2SO_4K$ | 6-COOH | H | $C_6H_{10}$—4-$NHOOCH_3$ |
| 4 | 2-$OCH_3$ | $C_2H_5$ | NHCOPh | 6-Cl | $CH_3$ | $CH_2CH_2Cl$ |
| 4 | 4-$OC_2H_5$ | $C_2H_5$ | NHCOPh | 5,6-di-Br | $C_2H_5$ | $C_6H_4$—p-Br |
| 4 | 4-$SO_3Na$ | $C_2H_5$ | $NHCOCH_3$ | 5,6-di-Br | H | $C_6H_4$—p-CN |
| 5 | 2-$SO_3Na$ | $C_2H_5$ | $OOCC_2H_5$ | 5-$OCH_3$—6-$NHCOCH_3$ | H | $CH_2CH_2CN$ |
| 5 | 2-$OCH_3$—4-$SO_3K$ | H | COOH | 6-$CH_2OOCCH_3$ | H | $CH_2CH_2OC_2H_5$ |
| 5 | 4-$OCH_2CH_2OSO_3K$ | H | H | 6-$CH_2Cl$ | H | $CH_2CH_2OCH_2CH_2OC_2H_5$ |
| 5 | 2-$SO_3Na$—5-Cl | H | H | 2-CN | H | $CH_2Ph$ |
| 5 | 4-Cl | H | $SO_2CH_3$ | 6-$OOCCH_3$ | $CH_3$ | $CH_2C_6H_{11}$ |
| 5 | 4-OH | H | $CF_3$ | 5-COOH | $CH_3$ | $C_6H_4$—o-OH |
| 5 | 4-$CH_2OOCCH_3$ | $C_3H_7$—n | $COOCH_3$ | 5-OH | $CH_3$ | $CH_2CH_2OH$ |
| 5 | 4-$SO_3K$ | $C_3H_7$—n | CHO | 5-$CH_2CH=CH_2$ | $C_2H_5$ | $CH_2CH_2$—$SO_3K$ |
| 5 | 4-OPh | H | $CONH_2$ | 6-$CH_3$ | $CH_3$ | $C_6H_4$—p-$OSO_3K$ |
| 5 | 4-$NO_2$ | H | $CONHCH_3$ | 5-$COCH_3$ | $CH_3$ | $CH_2OPh$ |
| 5 | 5-CN | H | $CH_2Ph$ | 6-$OCH_3$ | H | $CH_2SO_2NHPh$ |
| 5 | 4-$COCH_3$ | H | $CH_2SO_3K$ | 6-$SO_3Na$ | $CH_3$ | $CH_2SO_2NHCH_3$ |
| 5 | 5-$CH_3$ | H | $CH_2OSO_3K$ | 6-$OCH_2CH_2SO_4K$ | H | $C_6H_4$—p-$SO_2NHCH_3$ |
| 5 | 5-Ph | H | $C_6H_4$—p-$SO_3K$ | 6-$OCH_2CH_2SO_3K$ | H | $CH_2COOCH_3$ |
| 5 | 5-$OCH_3$ | H | $CH_2CH_2OH$ | 6-$CH_3$ | H | $CH_2SO_2N(CH_3)_2$ |
| 5 | 4,5-di-Br | H | $CH_2Cl$ | 2-Ph | H | $C_6H_4$—p-$NHCOOCH_3$ |
| 5 | 5-COOH | $C_4H_9$—n | $C_6H_4$—p-Br | 6-$NO_2$ | $C_2H_5$ | $CH_2CH_2CONH_2$ |
| 5 | H | H | H | 6-$OCH_3$ | $C_2H_5$ | $C_6H_4$—p-$CONHCH_3$ |
| 5 | 4-$NO_2$ | H | $COCH_3$ | 6-$NHCOCH_3$ | $CH_3$ | $C_6H_4$—p-$SCH_3$ |
| 5 | 4-CN | H | $NO_2$ | 6-$NHSO_2CH_3$ | $C_3H_7$—n | $CH_2CH_2SCH_3$ |
| 5 | 5-$COCH_3$ | H | Cl | 6-$COOCH_3$ | H | $CH_2$—$C_6H_4$—p-$SCH_3$ |
| 5 | 4-COPh | $CH_3$ | CN | 6-COOH | $CH_3$ | $CH_2SO_2C_2H_5$ |
| 5 | 2,4-di-COOH | $CH_3$ | $NHSO_2CH_3$ | 8-Cl | H | $CH_2SO_2Ph$ |
| 5 | 4-$OOCCH_3$ | $CH_3$ | $CH_3$ | 5,6-di-Br | H | $CH_2CH_2OSO_3K$ |
| 5 | 4-$NHCOCH_3$ | $CH_3$ | $OCH_3$ | 5,6-di-Br | H | $C_6H_4$—p-$OSO_3K$ |
| 5 | 4-NHCOPh | $CH_3$ | Ph | 2-$OCH_3$—6-$NHCOCH_3$ | H | $CH_2(C_8H_4O_2N)$ |
| 5 | 4-$CH_2CH=CH_2$ | H | H | 6-$NHCOCH_3$ | $C_2H_5$ | $C_2H_5$ |
| 5 | H | $CH_3$ | H | 6-OCPh | $C_2H_5$ | $C_2H_5$ |
| 5 | 4-$CONH_2$ | H | H | 6-$CH_2CONHCH_3$ | H | H |
| 5 | 3-$SO_2NH_2$ | H | $COCH_3$ | 6-$CH_2CON(CH_3)_2$ | $CH_3$ | Ph |
| 5 | 4-$SO_2NHCH_3$ | H | $NO_2$ | 6-$CH_2CH_2OCH_2CH_2OC_2H_5$ | $C_2H_4$ | $C_6H_{11}$ |
| 5 | 4-$SO_2N(C_2H_5)_2$ | H | Cl | 6-$CH_2SC_2H_5$ | H | $CH_2$—CH=$CH_2$ |
| 5 | 4-$SO_3C_6H_5$ | $CH_3$ | CN | 6-$CH_2SC_6H_5$ | H | $CH_2OOCC_2H_5$ |
| 5 | 4-$SCH_3$ | $CH_3$ | $NHSO_2CH_3$ | 6-$CH_2SO_2C_2H_5$ | H | $C_6H_4$—p-$OOCCH_3$ |
| 5 | 2,4-di-SCN | $CH_3$ | $CH_3$ | 6-$CH_2SO_2C_6H_5$ | H | $C_6H_{10}$—4-$CH_3$ |
| 5 | 4-$SO_2C_6H_5$ | $CH_3$ | $OCH_3$ | 6-$C_6H_3$—o,p-di-CN | H | $CH_2CH_2(C_4H_4O_2N)$ |
| 5 | 2-CHO—4-CN | $CH_3$ | Ph | 6-$C_6H_2$—o,m,p-tri-Cl | $CH_3$ | $CH_2CH_2NO_2$ |
| 5 | 4-$CONHC_2H_5$ | H | H | 6,8-di-$OSO_3N$ H($CH_3)_3$ | $CH_3$ | $C_6H_4$—p-$NO_2$ |
| 5 | 4-$CON(C_2H_5)_2$ | H | H | 5,6-di-$OSO_3Na$ | $CH_3$ | $CH_2NHOCCH_3$ |
| 5 | 3-$C_6H_{11}$ | H | $SO_3Na$ | 5,6-di-$OSO_3Na$ | $C_2H_5$ | $CH_2NHSO_2CH_3$ |
| 5 | 3-$SC_6H_5$ | H | $SO_3Na$ | 5,6-di-$SO_3N$ H($CH_3)_3$ | $CH_3$ | $C_6H_4$—p-$NHOCCH_3$ |
| 5 | 4-$NHSO_2C_6H_5$ | H | $OCH_2CH_2SO_4K$ | 5,6-di-$OSO_3Na$ | $CH_3$ | $C_6H_4$—p-$NHSO_2CH_3$ |
| 5 | 4-$SC_6H_{11}$ | H | $OCH_2CH_2SO_4K$ | 6-$SC_6H_{11}$ | H | $C_6H_{10}$—4-$NHOOCH_3$ |
| 5 | 4-$C_6H_4$—p-$CH_3$ | $C_2H_5$ | NHCOPh | 6-$C_6H_4$—p-$CH_3$ | $CH_3$ | $CH_2CH_2Cl$ |
| 5 | 4-$C_6H_4$—p-$CH_2CH=CH_2$ | $C_2H_5$ | NHCOPh | 6-$C_6H_4$—p-$CH_2CH=CH_2$ | $C_2H_5$ | $C_6H_4$—p-Br |
| 5 | 4-$OCH_2CH_2NO_2$ | $C_2H_5$ | $NHCOCH_3$ | 6-$OCH_2CH_2NO_2$ | H | $C_6H_4$—p-CN |
| 5 | 2-$CH_2NHCOCH_3$ | $C_2H_5$ | $OOCC_2H_5$ | 6-$CH_2NHCOCH_3$ | H | $CH_2CH_2CN$ |

TABLE 9-continued

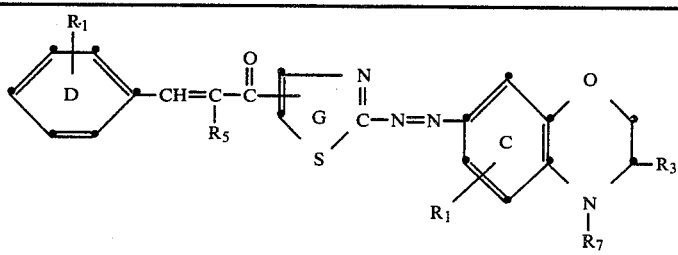

| Cinnamoyl Group Position | R₁ on D | R₅ | Substituents on G | R₁ on C | R₃ | R₇ |
|---|---|---|---|---|---|---|
| 5 | 4-CH$_2$NHSO$_2$C$_2$H$_5$ | H | COOH | 6-CH$_2$NHSO$_2$C$_2$H$_5$ | H | CH$_2$CH$_2$OC$_2$H$_5$ |
| 5 | 4-CH$_2$CH$_2$Cl | H | H | 6-CH$_2$CH$_2$Cl | H | CH$_2$CH$_2$OCH$_2$CH$_2$OC$_2$H$_5$ |
| 5 | 2,6-di-CH$_2$CN | H | H | 5,6-di-CH$_2$CN | H | CH$_2$Ph |
| 5 | 4-CH$_2$CH$_2$OC$_2$H$_5$ | H | SO$_2$CH$_3$ | 6-CH$_2$CH$_2$OC$_2$H$_5$ | CH$_3$ | CH$_2$C$_6$H$_{11}$ |
| 5 | 4-CH$_2$C$_6$H$_5$ | H | CH$_2$C$_6$H$_5$ | 6-COOH | CH$_3$ | C$_6$H$_4$—o-OH |
| 5 | 4-CH$_2$C$_6$H$_{11}$ | C$_3$H$_7$—n | COOCH$_3$ | 6-CH$_2$C$_6$H$_{11}$ | CH$_3$ | CH$_2$CH$_2$OH |
| 5 | 4-CH$_2$CH(OH)CH$_2$OH | C$_3$H$_7$—n | CHO | 6-CH$_2$CH(OH)CH$_2$OH | C$_2$H$_5$ | CH$_2$CH$_2$—SO$_3$K |
| 5 | 4-CH$_2$CH$_2$—SO$_3$K | H | CONH$_2$ | 6-CH$_2$CH$_2$—SO$_3$K | CH$_3$ | C$_6$H$_4$—p-OSO$_3$K |
| 5 | 4-CH$_2$OC$_6$H$_5$ | H | CONHCH$_3$ | 6-CH$_2$OC$_6$H$_5$ | CH$_3$ | CH$_2$OPh |
| 5 | 4-CH$_2$OOCC$_6$H$_5$ | H | CH$_2$Ph | 6-CH$_2$OOCC$_6$H$_5$ | H | CH$_2$SO$_2$NHPh |
| 5 | 5-CH$_2$COOCH$_3$ | H | CH$_2$SO$_3$K | 6-CH$_2$COOCH$_3$ | CH$_3$ | CH$_2$SO$_2$NHCH$_3$ |
| 5 | 4-C$_6$H$_4$—p-SO$_2$N(C$_2$H$_5$)$_2$ | H | CH$_2$OSO$_3$K | 6-C$_6$H$_4$—p-SO$_2$N(C$_2$H$_5$)$_2$ | H | C$_6$H$_4$—p-SO$_2$NHCH$_3$ |
| 5 | 4-CH$_2$CH$_2$NHCOOCH$_3$ | H | C$_6$H$_4$—p-SO$_3$K | 6-CH$_2$CH$_2$NHCOOCH$_3$ | H | CH$_2$COOCH$_3$ |
| 5 | 4-CH$_2$NHCONHCH$_3$ | H | CH$_2$CH$_2$OH | 6-CH$_2$NHCONHCH$_3$ | H | CH$_2$SO$_2$N(CH$_3$)$_2$ |
| 5 | 4-CH$_2$CONH$_2$ | H | CH$_2$Cl | 6-CH$_2$CONH$_2$ | H | C$_6$H$_4$—p-NHCOOCH$_3$ |
| 5 | 5-CH$_2$CONHCH$_3$ | C$_4$H$_9$—n | C$_6$H$_4$—p-Br | 6-CONH$_2$ | C$_2$H$_5$ | CH$_2$CH$_2$CONH$_2$ |
| 5 | 4-CH$_2$CON(CH$_3$)$_2$ | H | H | 6-SO$_2$NH$_2$ | C$_2$H$_5$ | C$_6$H$_4$—p-CONHCH$_3$ |
| 5 | 4-CH$_2$CH$_2$OCH$_2$CH$_2$OC$_2$H$_5$ | H | COCH$_3$ | 6-SO$_2$NHCH$_3$ | CH$_3$ | C$_6$H$_4$—p-SCH$_3$ |
| 5 | 4-CH$_2$SC$_2$H$_5$ | H | NO$_2$ | 6-SO$_2$N(C$_2$H$_5$)$_2$ | C$_3$H$_7$—n | CH$_2$CH$_2$SCH$_3$ |
| 5 | 5-CH$_2$SC$_6$H$_5$ | H | Cl | 6-SO$_3$C$_6$H$_5$ | H | CH$_2$—C$_6$H$_4$—p-SCH$_3$ |
| 5 | 4-CH$_2$SO$_2$C$_2$H$_5$ | CH$_3$ | CN | 6-SCH$_3$ | CH$_3$ | CH$_2$SO$_2$C$_2$H$_5$ |
| 5 | 2,4-di-CH$_2$SO$_2$C$_6$H$_5$ | CH$_3$ | NHSO$_2$CH$_3$ | 5,6-di-SCN | H | CH$_2$SO$_2$Ph |
| 5 | 4-C$_6$H$_3$—o,p-di-CN | CH$_3$ | CH$_3$ | 6-SO$_2$C$_6$H$_5$ | H | CH$_2$CH$_2$OSO$_3$K |
| 5 | 4-C$_6$H$_2$—o,m,p-tri-Cl | CH$_3$ | OCH$_3$ | 2-CHO—6-CN | H | C$_6$H$_4$—p-OSO$_3$K |
| 5 | 2,6-di-OSO$_3$Na | CH$_3$ | Ph | 5-CONHC$_2$H$_5$ | H | CH$_2$—(C$_8$H$_4$O$_2$N) |
| 5 | H | H | CH$_2$(C$_4$H$_4$O$_2$N) | 5-CON(C$_2$H$_5$)$_2$ | H | C$_2$H$_5$ |
| 5 | H | H | CH$_2$(C$_4$H$_3$O) | 6-C$_6$H$_{11}$ | H | C$_2$H$_5$ |
| 5 | 5-CH$_2$(C$_8$H$_4$O$_2$N) | H | H | 6-SC$_6$H$_5$ | H | C$_2$H$_5$ |
| 5 | 5-CH$_2$(C$_4$H$_3$O) | H | H | 6-NHSO$_2$C$_6$H$_5$ | H | C$_2$H$_5$ |

The invention has been described in detail with particular reference to preferred embodiments thereof, but it will be understood that variations and modifications can be effected within the spirit and scope of the invention.

I claim:

1. A dye having one of the structures

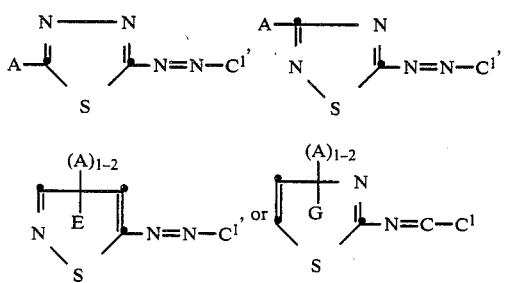

wherein: A is a group of the structure

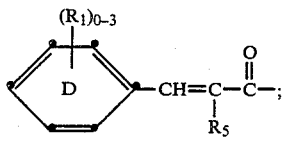

rings E and G are unsubstituted or substituted in any position not occupied by a cinnamoyl group wherein the ring E substituent is selected from alkyl, halogen, cyano, carbamoyl, CONHalkyl, alkoxycarbonyl, alkanoyl, alkanoyloxy, alkylthio, alkenylthio, arylthio, cyclohexylthio, aryloxy, and alkoxy, and the ring G substituent is selected from alkyl, aryl, alkoxycarbonyl, alkanoyloxy, carbamoyl, CONHalkyl, CON(alkyl)$_2$, halogen, cyano, thiocyano, alkylthio, alkylsulfonyl, arylsulfonyl, formyl, alkanoyl, and aroyl; R$_5$ is H or alkyl; and each R$_1$ is a group selected from alkyl, aralkyl, alkenyl of 2-6 carbons, aryl, cyclohexyl, cyclohexylalkyl, alkoxy, halogen, hydroxy, alkylsulfonyl, cyano, carbamoyl, alkanoyl, alkanoyloxy, aroyl, alkoxycarbonyl, amino, sulfamoyl, alkylsulfamoyl, dialkylsulfamoyl, alkanoylamino, SO$_3$C$_6$H$_5$, alkylthio, thiocyano, arylsulfonyl, formyl, alkylcarbamoyl, dialkylcarbamoyl, NO$_2$, —SO$_3$M, —OSO$_3$M, —COOH, aryloxy, arylthio, alkylsulfonylamino, aroylamino, arylsulfonylamino, and cyclohexylthio, wherein the alkyl, alkylene, alkenyl, aryl, and cyclohexyl moieties of the above $R_1$ groups are unsubstituted or substituted with 1-3 substituents different from the parent moiety and independently selected from alkanoyloxy, alkyl, alkenyl, succinimido, $-NO_2$, alkanoylamino, alkylsulfonylamino, 1-(2-pyrrolidono), halogen, cyano, alkoxy, aryl, cyclohexyl, hydroxy, $-SO_3M$, $-OSO_3M$, aryloxy, furyl, aroyloxy, alkoxycarbonyl, $-SO_2N(alkyl)_2$, NHCOOalkyl, NHCONHalkyl, glutarimido, phthalimido, $CONH_2$, CONHalkyl, $CON(alkyl)_2$, alkoxyalkoxy, alkylthio, arylthio, alkylsulfonyl, and arylsulfonyl, wherein M is selected from $H^+$, $NH_4^+$, $Na^+$, $K^+$, and the colorless cations of sulfuric acid or sulfonic acid salts of trimethylamine, triethylamine, tri(2-hydroxyethyl)amine, di(2-hydroxyethyl)amine, and N,N-dimethylaniline; and wherein the couplers $C^1$ have the formulae:

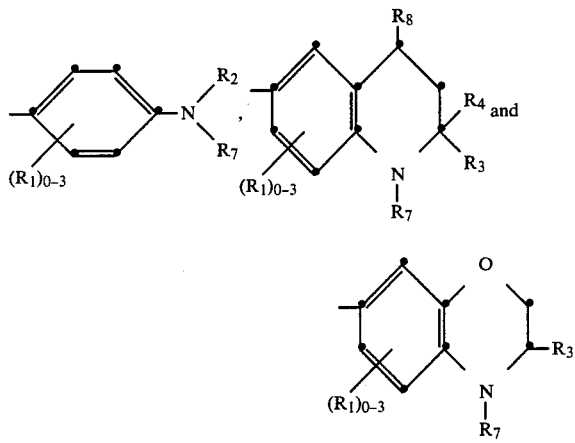

wherein each $R_1$ is as defined above; $R_2$ and $R_7$ are each selected independently from hydrogen, alkyl, cyclohexylalkyl, alkenyl of 2-6 carbons, aryl, aralkyl and cyclohexyl, all of which groups including alkylene moieties are unsubstituted or substituted as defined above for the substituted $R_1$ groups; and $R_3$, $R_4$ and $R_8$ are each selected from hydrogen and alkyl.

2. A dye according to claim 11 wherein: the substituents for rings E and G are selected from alkyl, alkylthio, halogen, cyano, alkoxycarbonyl, $CONH_2$, CONHalkyl, alkanoyl and alkanoyloxy; each $R_1$ on the cinnamoyl ring is selected from alkyl, aralkyl, aralkyl substituted with $-SO_3M$ or $-SO_4M$, cyclohexylalkyl, cyclohexylalkyl substituted with $-SO_3M$ or $-SO_4M$, alkoxy, or alkanoylamino; $R_2$ is H, alkyl, aralkyl, aralkyl substituted with $-SO_3M$ or $-SO_4M$, cyclohexylalkyl, or cyclohexylalkyl substituted with $-SO_3M$ or $-SO_4M$; $R_7$ is H, alkyl, aralkyl, aralkyl substituted with $-SO_3M$ or $-SO_4M$, cyclohexylalkyl, cyclohexylalkyl substituted with $-SO_3M$ or $-SO_4M$, sodio- or potassiosulfatoalkyl, sodio- or potassiosulfonicalkyl, or alkanoyloxyalkyl; each $R_1$ on the couplers is selected from aralkyl, aralkyl substituted with $-SO_3M$ or $-SO_4M$, cyclohexylalkyl, $-SO_3Na$, $-SO_3K$, halogen, $-SO_4Na$, $-SO_4K$, alkyl, alkoxy, $-COOH$, $-OH$, or cyclohexylalkyl substituted with $-SO_3M$ or $-SO_4M$; and $R_5$ is hydrogen.

3. A dye according to claim 1 wherein: the cinnamoyl ring D is unsubstituted or substituted with halogen, COOH, OH, or $SO_3M$; and wherein in an aniline coupler each substituent $R_1$ is a methyl, methoxy or acetamido group or a chlorine atom, each $R_2$ is hydrogen, a methyl or ethyl group or a sulfonated cyclohexyl or benzyl group and each $R_7$ is an ethyl or sulfonated ethyl group or an alkyl group of up to 4 carbon atoms substituted with a sulfonated phenyl group, each sulfonate group being of formula $-SO_3M$, and wherein in a tetrahydroquinoline coupler $R_1$ and $R_3$ are methyl groups, each of $R_4$ and $R_8$ is hydrogen or a methyl group, and $R_7$ is an ethyl group or a group of formula $CH_2CH_2OCOCH_3$ or $CH_2CH_2OSO_3M$.

4. A dye according to claim 1 wherein the coupler $C^1$ has the formula

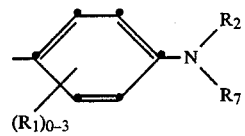

wherein: each $R_1$ is as defined in claim 1; and $R_2$ and $R_7$ are each selected independently from hydrogen, alkyl, alkenyl of 2-6 carbons, aryl, and cyclohexyl, all of which groups including alkylene moieties are unsubstituted or substituted as defined in claim 1 for the substituted $R_1$ groups.

5. A dye according to claim 1 wherein the coupler $C^1$ has the formula

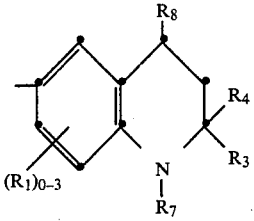

wherein: each $R_1$ is as defined in claim 1; $R_7$ is selected from hydrogen, alkyl, alkenyl of 2-6 carbons, aryl, and cyclohexyl, all of which groups including alkylene moieties are unsubstituted or substituted as defined in claim 1 for the substituted $R_1$ groups; and $R_3$, $R_4$ and $R_8$ are each selected from hydrogen and alkyl.

6. A dye according to claim 1 wherein the coupler $C^1$ has the formula

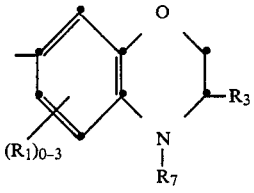

wherein: each $R_1$ is as defined in claim 1; $R_7$ is selected from hydrogen, alkyl, alkenyl of 2-6 carbons, aryl, and cyclohexyl, all of which groups including alkylene moieties are unsubstituted or substituted as defined in claim 1 for the substituted $R_1$ groups; and $R_3$ is selected from hydrogen and alkyl.

7. The dye of claim 1 having the formula:

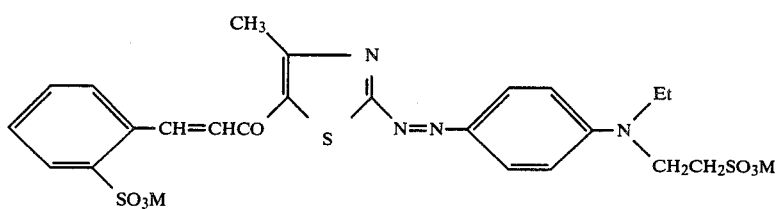
8. The dye of claim 1 having the formula:
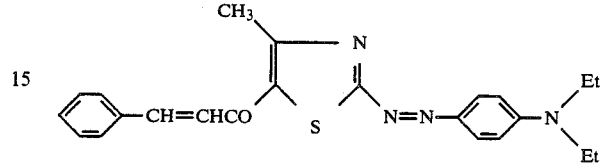
* * * * *